United States Patent
Moore et al.

(10) Patent No.: US 11,753,501 B2
(45) Date of Patent: Sep. 12, 2023

(54) FRONTALLY POLYMERIZED POLYMERIC BODY AND METHOD OF PRODUCING A POLYMERIC BODY HAVING SPATIALLY VARYING PROPERTIES

(71) Applicant: The Board of Trustees of the University of Illinois, Urbana, IL (US)

(72) Inventors: Jeffrey S. Moore, Savoy, IL (US); Nancy R. Sottos, Champaign, IL (US); Benjamin A. Suslick, Savoy, IL (US); Katherine Stawiasz, Champaign, IL (US); Justine E. Paul, Savoy, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/571,750

(22) Filed: Jan. 10, 2022

(65) Prior Publication Data

US 2022/0235173 A1    Jul. 28, 2022

Related U.S. Application Data

(60) Provisional application No. 63/136,396, filed on Jan. 12, 2021.

(51) Int. Cl.
*C08G 61/08*    (2006.01)
*C08K 5/56*    (2006.01)

(52) U.S. Cl.
CPC ............. *C08G 61/08* (2013.01); *C08K 5/56* (2013.01); *C08G 2261/3324* (2013.01);
(Continued)

(58) Field of Classification Search
None
See application file for complete search history.

(56) References Cited

U.S. PATENT DOCUMENTS

| 10,487,446 B2 | 11/2019 | Robertson et al. |
| 2018/0327531 A1 | 11/2018 | Moore et al. |
| 2020/0283594 A1 | 9/2020 | Sottos et al. |

FOREIGN PATENT DOCUMENTS

| DE | 102017130504 A1 | 6/2019 |
| WO | WO2006053071 A3 | 5/2006 |

(Continued)

OTHER PUBLICATIONS

Brøndsted, P.; Lilholt, H.; Lystrup, A. *Annu. Rev. Mater. Res.* 2005, 35, 505-538.
(Continued)

*Primary Examiner* — Fred M Teskin
(74) *Attorney, Agent, or Firm* — Crowell & Moring LLP

(57) ABSTRACT

A frontally polymerized polymeric body includes, according to a first embodiment, a deformable polymer comprising polydicyclopentadiene (pDCPD) and/or poly(5-ethylidene-2-norbornene) (pENB), where the deformable polymer has a fracture strain of at least about 0.5 mm mm$^{-1}$. According to a second embodiment, the frontally polymerized polymeric body includes a first polymer comprising pDCPD and/or pENB, and a second polymer adjacent to the first polymer also comprising the pDCPD and/or the pENB. The second polymer is more or less deformable than the first polymer. Thus, the frontally polymerized polymeric body exhibits spatially varying mechanical and/or other properties.

19 Claims, 18 Drawing Sheets

(52) U.S. Cl.
CPC ............... *C08G 2261/3325* (2013.01); *C08G 2261/418* (2013.01); *C08G 2261/60* (2013.01); *C08G 2261/62* (2013.01)

(56) References Cited

FOREIGN PATENT DOCUMENTS

| WO | WO2017/185324 A1 | 2/2017 |
| WO | WO2019/120950 A1 | 6/2019 |
| WO | WO2020099750 A1 | 5/2020 |

OTHER PUBLICATIONS

Karbhari, V. M.; Seible, F. *Appl. Compos. Mater.* 2000, 7, 95-124.
Timmis, A. J.; Hodzic, A.; Koh, L.; Bonner, M.; Soutis, C.; Schäfer, A. W.; Dray, L. *Int. J. Life Cycle Assess.* 2015, 20, 233-243.
Friedrich, K.; Almajid, A. A. *Appl. Compos. Mater.* 2013, 20, 107-128.
Abliz, D.; Duan, Y.; Steuernagel, L.; Xie, L.; Li, D.; Ziegmann, G. *Polymers and Polymer Composites* 2013, 21, 341-348.
Bachmann, J.; Hidalgo, C.; Bricout, S. *Sci. China Technol. Sci.* 2017, 60, 1301-1317.
Pojman, J. A.; Ilyashenko, V. M.; Khan, A. M. *J. Chem. Soc., Faraday Trans.* 1996, 92, 2825-2837.
Pojman, J. A. In *Polymer Science: A Comprehensive Reference*; Matyjaszewski, K., Möller, M., Eds.; Elsevier: Amsterdam, 2012, p. 957-980.
Robertson, I. D.; Yourdkhani, M.; Centellas, P. J.; Aw, J. E.; Ivanoff, D. G.; Goli, E.; Lloyd, E. M.; Dean, L. M.; Sottos, N. R.; Geubelle, P. H.; Moore, J. S.; White, S. R. *Nature* 2018, 557, 223-227.
Dean, L. M.; Wu, Q.; Alshangiti, O.; Moore, J. S.; Sottos, N. R. *ACS Macro Lett.* 2020, 9, 819-824.
Liu, H.; Wei, H.; Moore, J. S. *ACS Macro Lett.* 2019, 8, 846-851.
Mariani, A.; Fiori, S.; Chekanov, Y.; Pojman, J. A. *Macromolecules* 2001, 34, 6539-6541.
Robertson, I. D.; Dean, L. M.; Rudebusch, G. E.; Sottos, N. R.; White, S. R.; Moore, J. S. *ACS Macro Lett.* 2017, 6, 609-612.
Robertson, I. D.; Pruitt, E. L.; Moore, J. S. *ACS Macro Lett.* 2016, 5, 593-596.
Ivanoff, D. G.; Sung, J.; Butikofer, S. M.; Moore, J. S.; Sottos, N. R. *Macromolecules* 2020.
Stawiasz, K. J.; Paul, J. E.; Schwarz, K. J.; Sottos, N. R.; Moore, J. S. *ACS Macro Lett.* 2020.
Ogba, O. M.; Warner, N. C.; O'Leary, D. J.; Grubbs, R. H. *Chem. Soc. Rev.* 2018, 47, 4510-4544.
Keitz, B. K.; Endo, K.; Patel, P. R.; Herbert, M. B.; Grubbs, R. H. *J. Am. Chem. Soc.* 2012, 134, 693-699.
Herbert, M. B.; Suslick, B. A.; Liu, P.; Zou, L.; Dornan, P. K.; Houk, K. N.; Grubbs, R. H. *Organometallics* 2015, 34, 2858-2869.
Monsaert, S.; Lozano Vila, A.; Drozdzak, R.; Van Der Voort, P.; Verpoort, F. *Chem. Soc. Rev.* 2009, 38, 3360-3372.
Herbert, M. B.; Lan, Y.; Keitz, B. K.; Liu, P.; Endo, K.; Day, M. W.; Houk, K. N.; Grubbs, R. H. *J. Am. Chem. Soc.* 2012, 134, 7861-7866.
Sanford, M. S.; Love, J. A.; Grubbs, R. H. *J. Am. Chem. Soc.* 2001, 123, 6543-6554.
Stawiasz, K. J.; Paul, J. E.; Schwarz, K. J.; Sottos, N. R.; Moore, J. S. *ACS Macro Lett.* 2020, 1563-1568.
Dean, L. M.; Ravindra, A.; Guo, A. X.; Yourdkhani, M.; Sottos, N. R. *ACS Appl. Polym. Mater.* 2020, 2, 4690-4696.

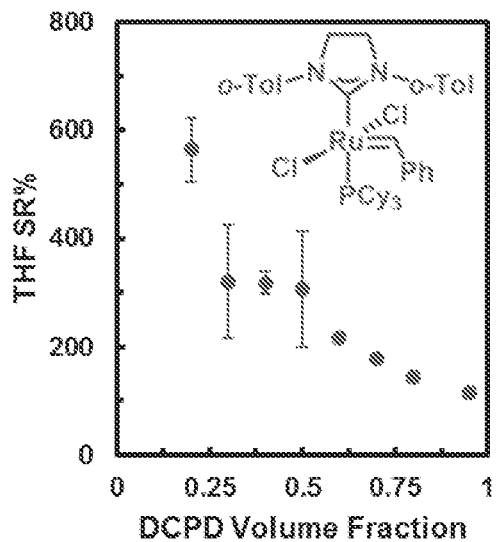
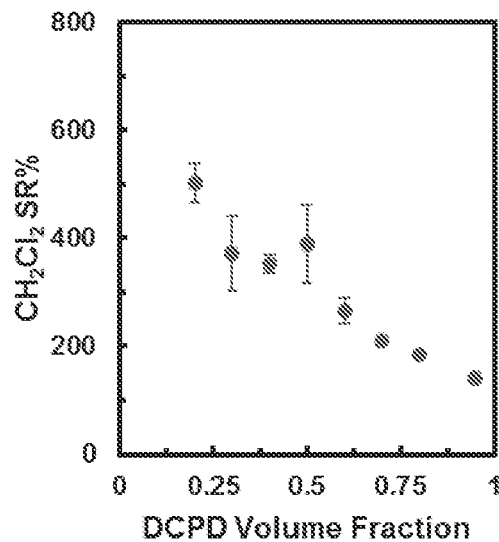
FIG. 5A
FIG. 5B
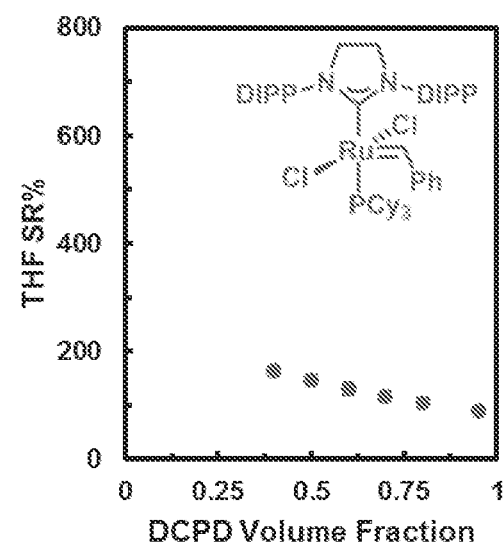
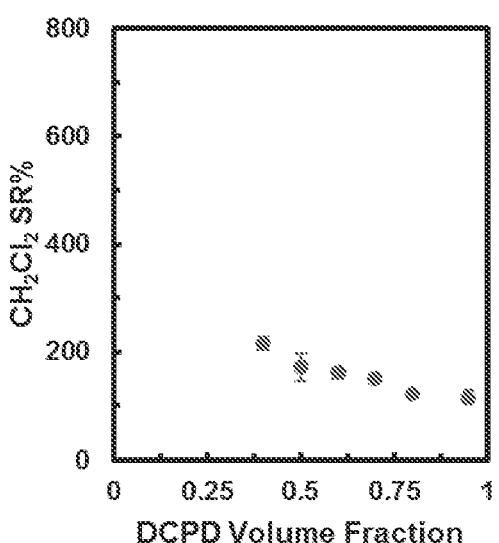
FIG. 6A
FIG. 6B

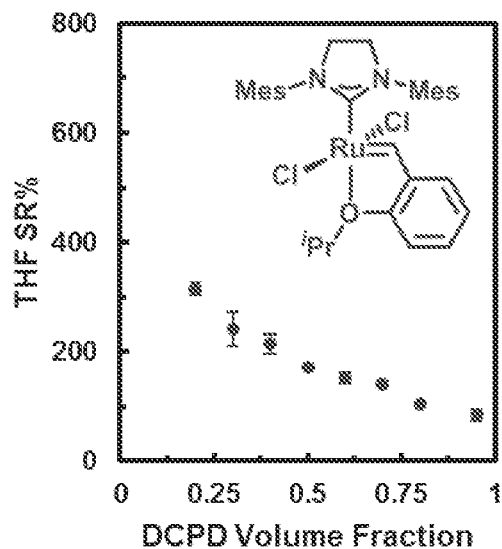
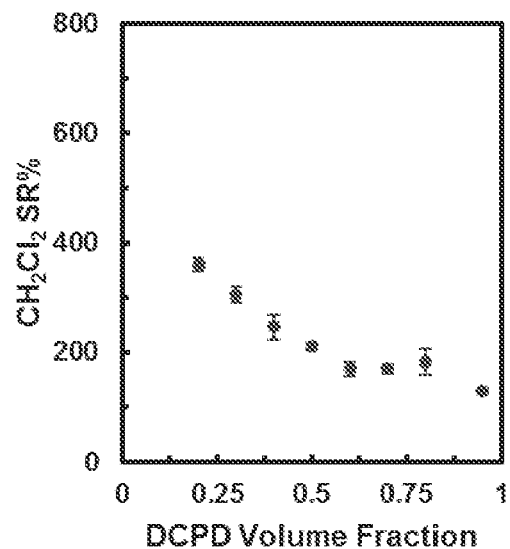
FIG. 7A                FIG. 7B
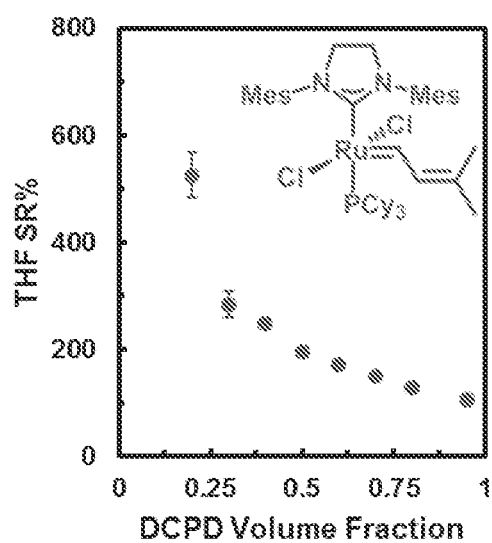
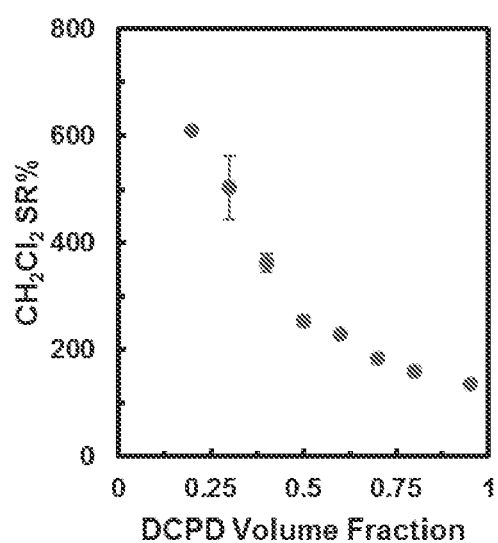
FIG. 8A                FIG. 8B

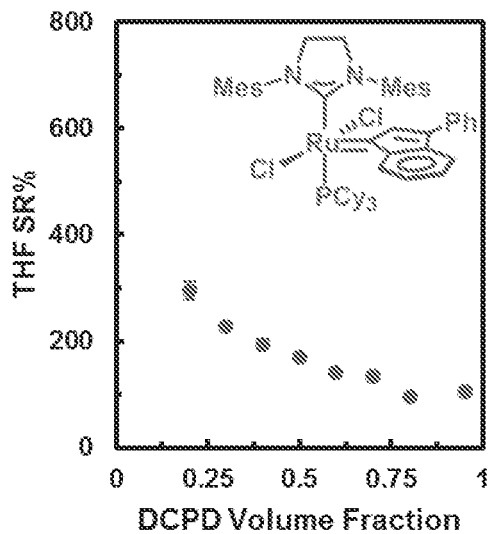
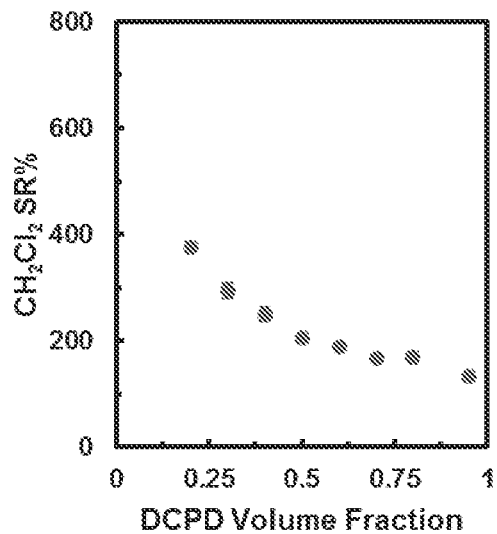
FIG. 9A　　　　　　　　FIG. 9B
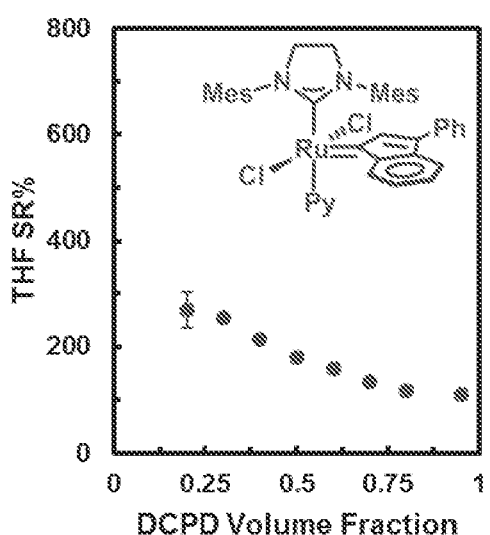
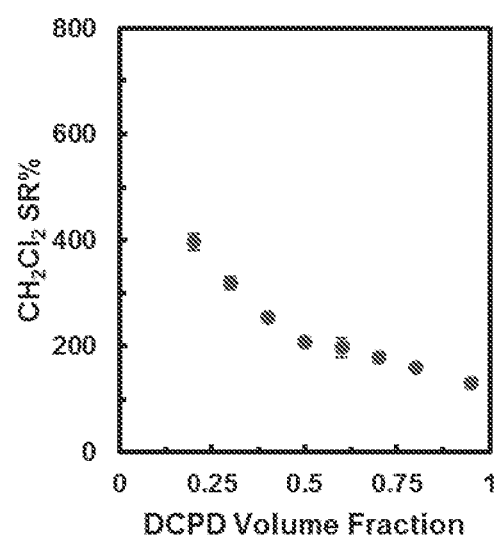
FIG. 10A　　　　　　　FIG. 10B

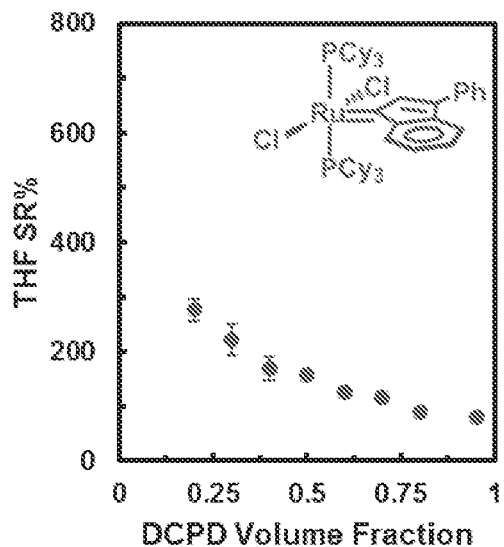
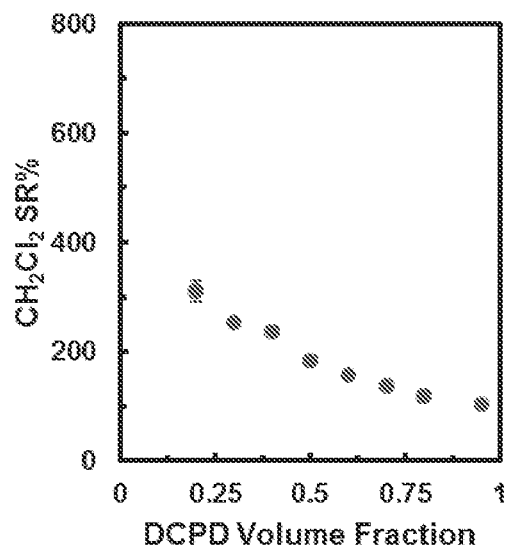
FIG. 11A
FIG. 11B
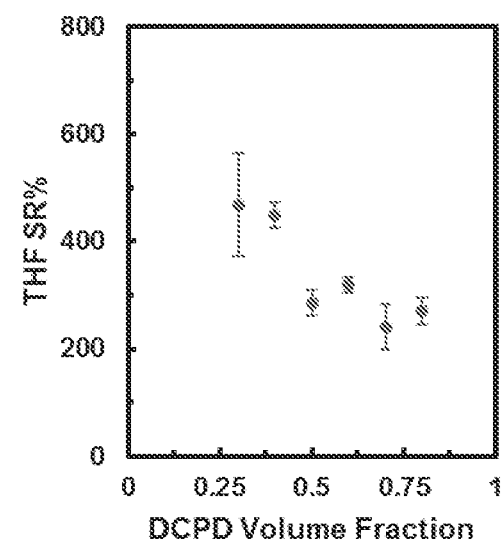
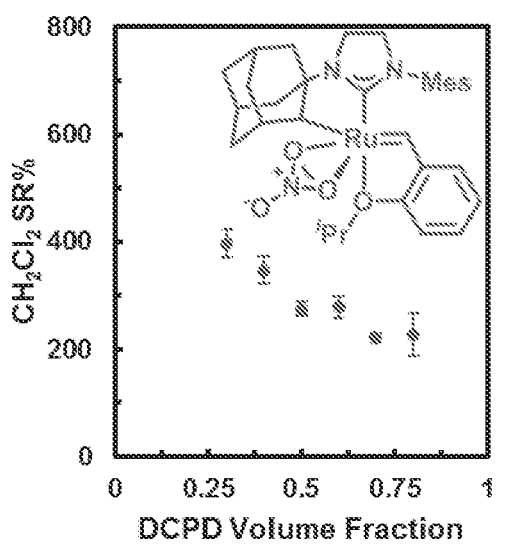
FIG. 12A
FIG. 12B

FRONTALLY POLYMERIZED POLYMERIC BODY AND METHOD OF PRODUCING A POLYMERIC BODY HAVING SPATIALLY VARYING PROPERTIES

RELATED APPLICATION

The present patent document claims the benefit of priority under 35 U.S.C. 119(e) to U.S. Provisional Patent Application No. 63/136,396, which was filed on Jan. 12, 2021, and is hereby incorporated by reference in its entirety.

FEDERALLY SPONSORED RESEARCH OR DEVELOPMENT

This invention was made with government support under FA9550-16-1-0017 awarded by the Air Force Office of Scientific Research (AFOSR) and NSF CMMI 19-33932 awarded by the National Science Foundation (NSF). The government has certain rights in the invention.

TECHNICAL FIELD

The present disclosure is related generally to the fabrication of polymers having controlled properties, and more particularly to a frontal polymerization process for preparing such polymers.

BACKGROUND

Thermoset polymers and composites are employed in numerous industrial applications that require structurally rigid, yet low-density, materials. Traditional curing methods involve prolonged heating and are limited by the size of oven or autoclave employed. To improve energy efficiencies and reduce capital investment costs, a need exists for new, robust chemical processes that exploit reaction enthalpy to self-sustain catalysis with minimal energy inputs. Frontal ring-opening metathesis polymerization ("FROMP" or "frontal polymerization") catalyzed by ruthenium complexes, for example, has emerged as a promising catalytic platform relevant to several practical applications. In FROMP, an initial thermal (or photo) stimulus initiates a polymerization event. The heat released from the catalytic ring opening of highly strained cyclic olefin monomers triggers subsequent catalytic events ahead of the reaction zone. The net process, therefore, involves a reaction zone that traverses through the monomer resin with a measurable velocity and a well-defined monomer-to-polymer interface. FROMP is described in U.S. Patent Application No. 62/991,781, which was filed on Mar. 19, 2020, and is hereby incorporated by reference in its entirety.

Frontal polymerization is predicated on minimal background reactivity prior to the triggering stimulus. Some metathesis catalysts, however, react with strained olefinic monomers on a time scale fast enough to preclude reasonable storage times; that is, the addition of catalyst to monomer resins may induce spontaneous polymerization. One method to circumvent this reactivity involves the addition of inhibiting co-additives ("inhibitors"). For example, the addition of P(O$^n$Bu)$_3$ to a dicyclopentadiene (DCPD) resin with 2nd generation Grubbs catalyst ((SIMes)RuCl$_2$(PCy$_3$); "Ru-1"), for example, may extend the shelf life of the resin to nearly 30 h. Despite the versatility of Ru-1 towards FROMP, other catalyst architectures—and their impact on FROMP and the resulting polymers—remain unexplored.

BRIEF SUMMARY

A surprisingly deformable frontally polymerized polymeric body comprising polydicyclopentadiene (pDCPD) and/or poly(5-ethylidene-2-norbornene) (pENB) is described in this disclosure. Also described is a method of producing a polymeric body comprising pDCPD and/or pENB that exhibits spatially varying mechanical and/or other properties.

According to a first embodiment, the frontally polymerized polymeric body includes a deformable polymer comprising pDCPD and/or pENB, where the deformable polymer has a fracture strain of at least about 0.5 mm mm$^{-1}$.

According to a second embodiment, the frontally polymerized polymeric body includes (a) a first polymer comprising pDCPD and/or pENB, and (b) a second polymer adjacent to the first polymer also comprising the pDCPD and/or the pENB. The second polymer is more or less deformable than the first polymer. Thus, the frontally polymerized polymeric body exhibits spatially varying mechanical and/or other properties.

The method of producing a polymeric body including spatially varying mechanical properties comprises the following steps. First, a region of a first resin formulation is activated to initiate an exothermic polymerization reaction and generate a self-propagating polymerization front, where the first resin formulation comprises: dicyclopentadiene (DCPD) and/or 5-ethylidene-2-norbornene (ENB) at a DCPD:ENB volume ratio in a range from 0:100 to 100:0; and a ruthenium catalyst. As the self-propagating polymerization front moves through the first resin formulation and polymerizes the DCPD and/or the ENB, a first polymer comprising pDCPD and/or pENB is formed. While the self-propagating polymerization front moves through the first resin formulation, a second resin formulation is deposited on the first resin formulation downstream of the polymerization front. The second resin formulation also includes the DCPD and/or the ENB, but comprises a different ruthenium catalyst and/or a different combination of ruthenium catalysts and/or a different volume ratio of DCPD to ENB than the first resin formulation. As the self-propagating polymerization front moves through the second resin formulation and polymerizes the DCPD and/or the ENB, a second polymer comprising the pDCPD and/or the pENB is formed adjacent to the first polymer. The second polymer is more or less deformable than the first polymer, and thus the polymeric body exhibits spatially varying mechanical and/or other properties.

BRIEF DESCRIPTION OF THE DRAWINGS

FIGS. 5A and 5B show SR % for polymers derived from catalyst solution Ru-2 at various DCPD:ENB volume ratios.

FIGS. 6A and 6B show SR % for polymers derived from catalyst solution Ru-3 at various DCPD:ENB volume ratios.

FIGS. 7A and 7B show SR % for polymers derived from catalyst solution Ru-4 at various DCPD:ENB volume ratios.

FIGS. 8A and 8B show SR % for polymers derived from catalyst solution Ru-5 at various DCPD:ENB volume ratios.

FIGS. 9A and 9B show SR % for polymers derived from catalyst solution Ru-6 at various DCPD:ENB volume ratios.

FIGS. 10A and 10B show SR % for polymers derived from catalyst solution Ru-7 at various DCPD:ENB volume ratios.

FIGS. 11A and 11B show SR % for polymers derived from catalyst solution Ru-8 at various DCPD:ENB volume ratios.

FIGS. 12A and 12B show SR % for polymers derived from catalyst solution Ru-9 at various DCPD:ENB volume ratios.

DETAILED DESCRIPTION

The emergence of FROMP has enabled a new class of energy efficient polymer fabrication and in situ curing techniques. In this disclosure, nine catalysts are explored for the FROMP of DCPD and/or ENB to generate homopolymers and copolymers (e.g., see FIGS. 1A and 1B), and their properties are investigated. Surprisingly, it is discovered that the catalyst complex, as well as the ratio of monomers, may influence the mechanical and physical properties of the resulting polymer. For example, pDCPD, which is a characteristically rigid polymer with an elastic modulus (E) in a range from about 1.4 to 2.6 GPa, may exhibit elastomeric behavior at room temperature, depending on the catalyst selection. Based on these findings, frontally polymerized polymeric bodies that exhibit unusual deformability or deformable regions are described in this disclosure, along with a method of producing polymeric bodies having spatially varying mechanical properties.

Frontal polymerization methods are discussed below in reference to FIGS. 1C and 1D, but first, characteristics of polymeric bodies that may result from frontal polymerization are described. Referring to the right-hand side of FIG. 1C, the frontally polymerized polymeric body 112 may include, according to one embodiment, a deformable polymer 108 comprising pDCPD and/or pENB and having a fracture strain of at least about 0.5 mm mm$^{-1}$. The deformable polymer 108 may form part or all of the polymeric body 112. As will be discussed further below, the deformable polymer 108 may exhibit room temperature mechanical properties that are consistent with an elastomeric or ductile polymer, e.g., the above-mentioned fracture strain, an elastic modulus below 0.1 GPa, and/or an ultimate tensile strength of less than 5 MPa. Also or alternatively, the deformable polymer 108 may exhibit a high swelling ratio of at least about 270% (e.g., 270-450%) and/or comprise a glass transition temperature below room temperature (20-25° C.). In some examples, the deformable polymer 108 may be a copolymer comprising the pDCPD and the pENB. In such a case, the copolymer may be referred to as p(DCPD-co-ENB). In other examples, the deformable polymer 108 may be a homopolymer comprising (only) the pENB or pDCPD.

Figures 1A, 1B:
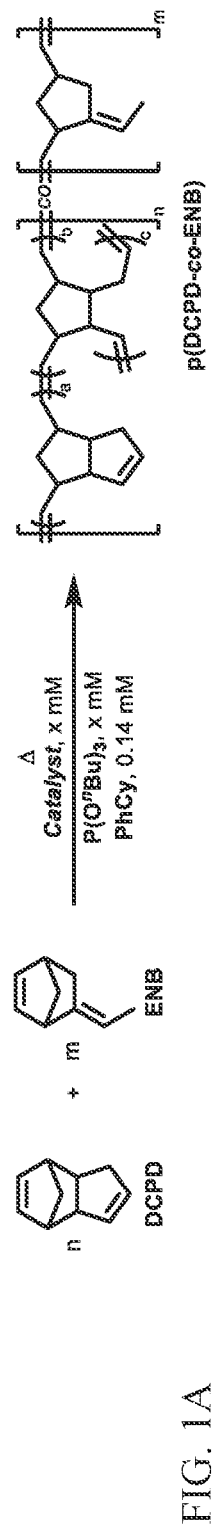
FIG. 1A shows exemplary components of a frontal polymerization reaction and the resulting co-polymer (p(DCPD-co-ENB)).
FIG. 1B shows FROMP ruthenium catalysts (Ru-1, Ru-2, Ru-3, Ru-4, Ru-5, Ru-6, Ru-7, Ru-8, and Ru-9) and exemplary catalyst solution compositions, which include the depicted catalysts and P(O$^n$Bu)$_3$ at the concentrations listed, with phenylcyclohexane (PhCy) as a solubilizing co-additive with a total resin volume of 3 mL, where Mes=2,4,6-Me$_3$C$_6$H$_2$, o-Tol=2-MeC$_6$H$_4$, DIPP=2,6-$^i$Pr$_2$C$_6$H$_3$, Cy=C$_6$H$_{11}$, Py=C$_5$H$_5$N.
Figure 1C:
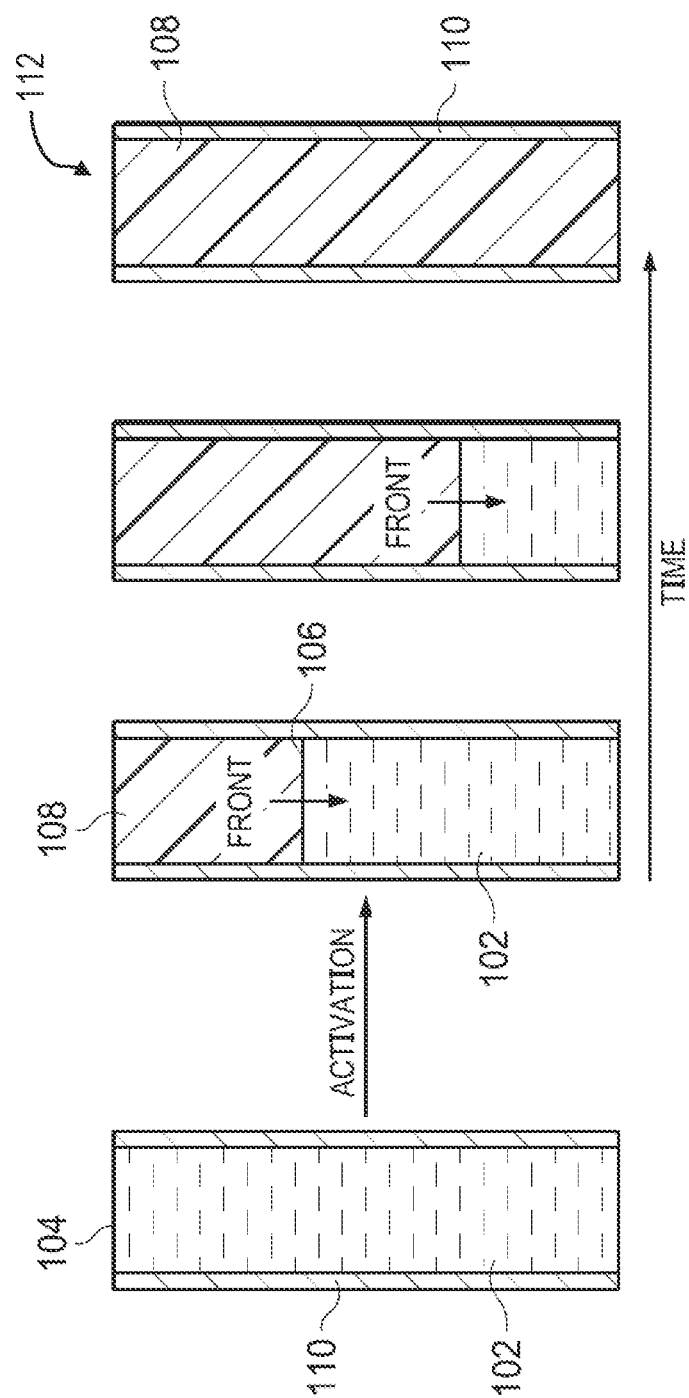
FIG. 1C shows an exemplary frontal polymerization process to form a polymeric body that exhibits ductile or elastomeric behavior at room temperature.
Figure 1D:
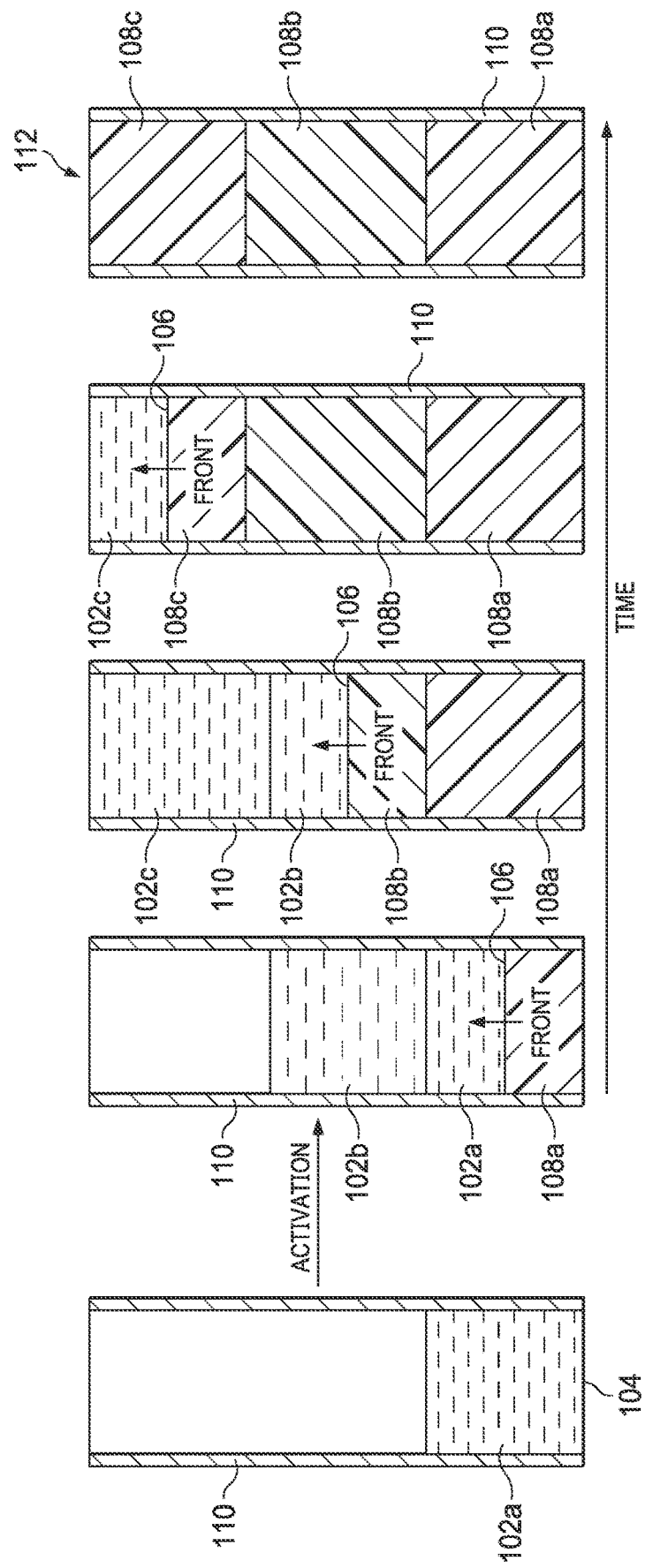
FIG. 1D shows an exemplary frontal polymerization process to form a polymeric body having spatially varying mechanical and/or other properties.

According to another embodiment, as shown on the right-hand side of FIG. 1D, the frontally polymerized polymeric body 112 may include: a first polymer 108a comprising pDCPD and/or pENB; and a second polymer 108b adjacent to the first polymer 108a that also comprises the pDCPD and/or the pENB, where the second polymer 108b is more or less deformable than the first polymer 108a. In other words, the second polymer 108b has a higher or lower fracture strain, a lower or higher elastic modulus, and/or a lower or higher ultimate tensile strength than the first polymer 108a. The second polymer 108b may also comprise a lower or higher degree of crosslinking than the first polymer 108a. If the first polymer 108a is more deformable than the second polymer 108b, then the first polymer 108a may be understood to be the "deformable polymer" referred to above and elsewhere in this disclosure, which may have a fracture strain of at least about 0.5 mm mm$^{-1}$. Also or alternatively, the second polymer 108b may be understood to be the "deformable polymer."

The polymeric body 112 is not limited to the first and second polymers 108a, 108b, although in some examples the first and second polymers 108a, 108b may make up an entirety of the polymeric body 112. The polymeric body 112 may further include one or more additional polymers 108c adjacent to the second polymer 108b, as shown in FIG. 1D. The one or more additional polymers 108c may also comprise the pDCPD and/or the pENB and may be more or less deformable than the first polymer 108a and/or the second polymer 108b. For example, the one or more additional polymers 108c may have a higher or lower fracture strain, a lower or higher elastic modulus, and/or a lower or higher ultimate tensile strength than the first polymer 108a and/or the second polymer 108b. The one or more additional polymers 108c may also or alternatively comprise a lower or higher degree of crosslinking than the first polymer and/or the second polymer. The one or more additional polymers may further have different mechanical or physical properties (e.g., fracture strain, elastic modulus, tensile strength) and/or degree of crosslinking from each other. Due to the presence of the first polymer, the second polymer, and/or the one or more additional polymers, the polymeric body may have spatially varying mechanical and/or other properties.

Referring again to FIGS. 1A and 1B, the polymeric body 112 of the preceding embodiments may be prepared by frontal polymerization from one or more suitable resin formulations. For example, the resin formulation may include: a monomer solution comprising a predetermined amount of DCPD and/or ENB, where the predetermined amount includes up to 95 vol. % DCPD and up to 100 vol. % ENB; and a catalyst solution comprising a ruthenium catalyst (or multiple ruthenium catalysts), such as Ru-1, Ru-2, Ru-3, Ru-4, Ru-5, Ru-6, Ru-7, Ru-8, and/or Ru-9, which are identified in FIG. 1B and Table 1. The catalyst solution, and thus the resin formulation, may further comprise phenylcyclohexane (PhCy) as a solubilizing co-additive and/or P(O"Bu)$_3$ or another organophosphite as an inhibitor.

The resin formulation may include the DCPD and/or ENB at a predetermined volume ratio, such as a DCPD:ENB volume ratio in a range from 0:100 to 100:0, and more typically in the range from 0:100 to 95:5, since a small amount of ENB may ensure that the DCPD behaves as a liquid at room temperature. Accordingly, the monomer solution may include from 0 vol. % to 100% DCPD or from 0 vol. % to 95 vol. % DCPD, and from 0 vol. % to 100 vol. % ENB or from 5 vol. % to 100 vol. % ENB, where the vol. % is determined based on the total volume of the monomers in the monomer solution. For example, for the co-monomers DCPD and ENB, vol. % DCPD=(volume of DCPD/(volume of DCPD+volume of ENB))×100; vol. % ENB=(volume of ENB/(volume of DCPD+volume of ENB))×100).

FIG. 1B shows the structure of the nine ruthenium catalysts investigated in this disclosure for frontal polymerization, and Table 1 provides molar masses and exemplary vendor names for the catalysts. The ruthenium catalysts contain various N-heterocyclic carbene ligands (Ru-1, -2, -3), Schrock-type alkylidene fragments (Ru-1, -4, -5, -6), and/or ancillary ligands (Ru-4, -6, -7, -8). Additionally, a bis-chelating complex, Ru-9, is investigated due to its unique structure. In addition to the catalyst architectures, FIG. 1B also shows exemplary formulations for the catalyst solutions. Referring to FIG. 1B, each catalyst solution includes PhCy (0.14 mM in these examples) in addition to the ruthenium catalyst, and six of the nine also include P(O"Bu)$_3$.

TABLE 1

Molar masses for catalysts Ru-1 - Ru-9 and exemplary vendors/products.

| Catalyst | Millipore Sigma Product Name | CAS Number | Molar Mass (g mol$^{-1}$) |
|---|---|---|---|
| Ru-1 | Grubbs Catalyst M204 (aka 2nd Generation Grubbs Catalyst) | 246047-72-3 | 849 |
| Ru-2 | Grubbs Catalyst M205 | 927429-60-5 | 793 |
| Ru-3 | Grubbs Catalyst M206 | 373640-75-6 | 933 |
| Ru-4 | Hoveyda-Grubbs Catalyst M720 | 01224-40-8 | 626 |
| Ru-5 | Grubbs Catalyst M207 | 253688-91-4 | 827 |
| Ru-6 | Grubbs Catalyst M202 | 536724-67-1 | 949 |
| Ru-7 | Grubbs Catalyst M310 | 1031262-76-6 | 748 |
| Ru-8 | Grubbs Catalyst M101 | 250220-36-1 | 923 |
| Ru-9 | Hoveyda-Grubbs Catalyst M2001 | 1352916-84-7 | 633 |

As will be explained below, the ruthenium catalyst employed for frontal polymerization may advantageously comprise the bis-chelating complex "Ru-9" shown in FIG. 1B. Work described in this disclosure reveals that the incorporation of Ru-9 into the resin formulation may result in surprising changes in the mechanical and/or other properties of the frontally polymerized polymeric body.

Frontal polymerization to produce the polymeric body exhibiting ductile or elastomeric behavior at room temperature may include the following steps. First, a resin formulation 102 is prepared, as indicated above, and held in a mold or other container 110, as illustrated in FIG. 1C. The resin formulation 102 may include a monomer solution including a predetermined amount of DCPD and/or ENB, such as up to 95 vol. % DCPD and up to 100 vol. % ENB, and a catalyst solution comprising a ruthenium catalyst. The resin formulation 102 may comprise a DCPD:ENB volume ratio in a range from 0:100 to 95:5. The ruthenium catalyst may comprise any of the catalysts identified in FIG. 1B and Table 1; however, it may be preferred to employ the Ru-9 catalyst to prepare polymer with elastomeric behavior at room temperature. In some examples, more than one of the ruthenium catalysts may be employed. Typically, the monomer solution includes 60-95 vol. % DCPD and from 5-40 vol. % ENB. Stated differently, the resin formulation 102 typically has a DCPD:ENB volume ratio in a range from 60:40 to 95:5. In some examples, the monomer solution includes from 60-80 vol. % DCPD and from 20-40 vol. % ENB, and/or the resin formulation 102 may be described as having a DCPD:ENB volume ratio in the range from 60:40 to 80:20.

Frontal polymerization occurs upon activation of a region 104 of the resin formulation 102. The region 104 may be activated with heat, light and/or another activator, as discussed further below, to initiate an exothermic polymerization reaction. The result is a self-propagating polymerization front 106 that moves through the resin formulation 102 and polymerizes the DCPD and/or the ENB. The resin formulation 102 is typically in a liquid state, and thus may be referred to as a liquid resin formulation, until the polymerization front 106 passes through. After frontal polymerization, the deformable polymer 108 may exhibit a degree of cure of 95% or higher and no post-curing may be needed. A deformable polymer 108 comprising pDCPD and/or pENB as described above may be formed by frontal polymerization. As indicated above, the deformable polymer 108 may be a copolymer comprising the pDCPD and the pENB. In some cases, the deformable polymer may be a homopolymer comprising (only) the pENB or pDCPD. The deformable polymer 108 may form part or all of the polymeric body 112.

To elucidate the mechanical properties and swelling behavior of polymers derived from the catalyst solutions described in FIG. 1B, quasi-static tensile testing, dynamic mechanical analysis (DMA), and polymer swell tests are carried out. The elastic modulus (E), yield strength, and fracture strain of each polymer are derived from the tensile tests, which are carried out under ambient conditions (e.g., room temperature (20-25° C.)). DMA experiments are employed to probe temperature dependent mechanical properties. The glass-transition temperature ($T_g$) for polymers derived from each catalytic system is determined as the maxima of the ratio of the E'/E', known as tan δ. The polymers tested are derived from resin formulations including DCPD:ENB volume ratios of 80:20 and 60:40, as the latter composition supports well-defined reaction fronts for every catalyst solution.

Figure 2:
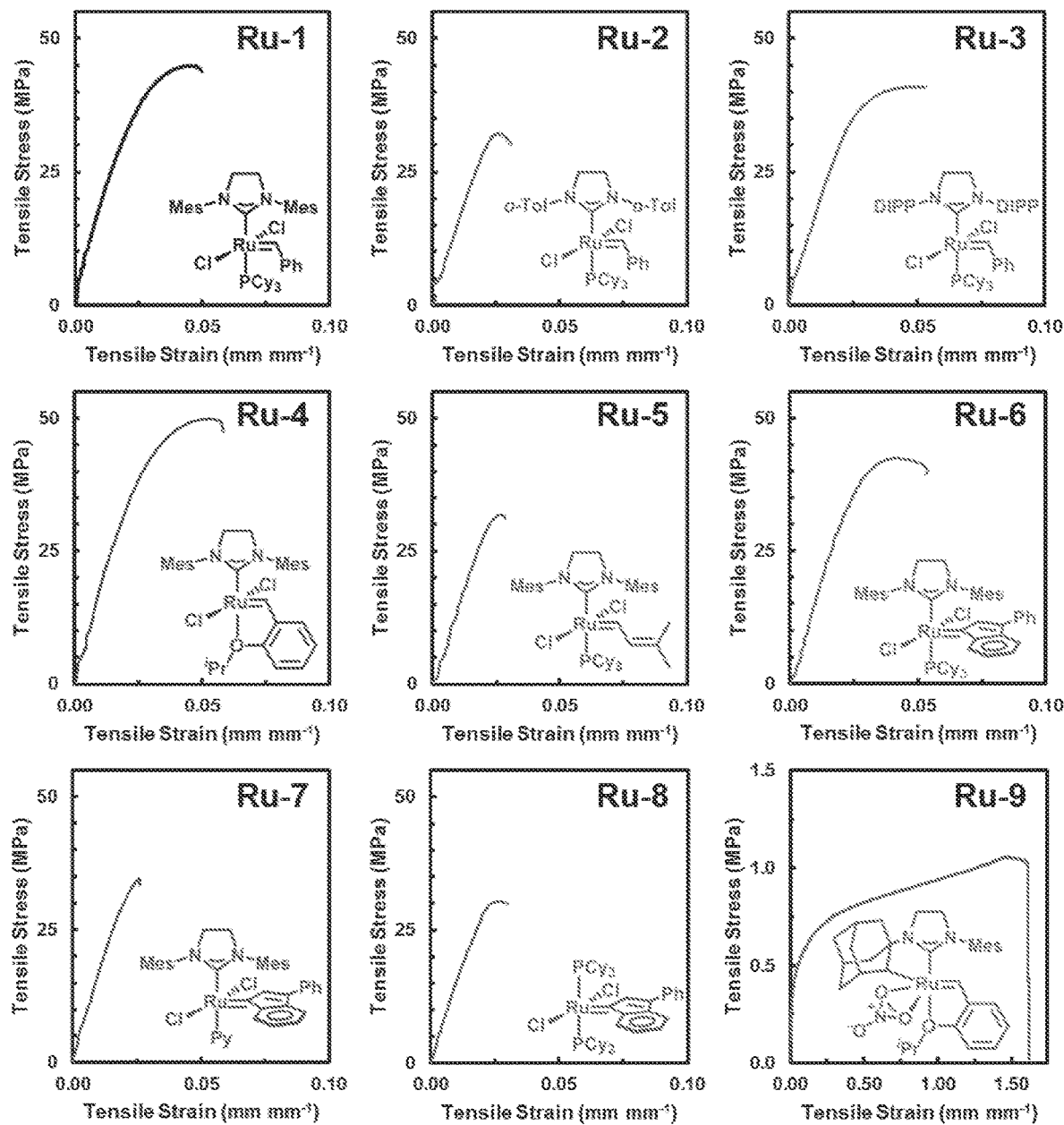
FIG. 2 shows tensile stress-strain data for polymers derived from each catalyst solution at a DCPD:ENB volume ratio of 60:40.

For most of the ruthenium catalysts, the composition of the resin formulation only slightly influences the stress-strain behavior of the resultant polymer. Copolymers derived from Ru-1 through Ru-8 at a DCPD:ENB volume ratio of 60:40, for example, exhibit E values in the range of 1.3 to 1.6 GPa, as shown in Table 2 below. Indeed, these values match reasonably well with those observed for other highly crosslinked, frontally derived p(DCPD). This similarity is also borne out in the ultimate tensile strengths (about 25-50 MPa) and fracture strains (about 10-2 mm/mm) of these copolymers, as shown by the data in Table 2 and the plots of FIG. 2.

Exceedingly unusual stress-strain properties are observed, however, from polymers derived from catalyst Ru-9 at a DCPD:ENB volume ratio of 60:40. The Young's modulus (20 MPa) and ultimate tensile strength (1.06 MPa) are nearly 2 orders of magnitude smaller than those observed with Ru-1 through Ru-8. Additionally, the Ru-9 derived polymer exhibits a distinct yield point (0.62 MPa) separate from its ultimate tensile strength, as apparent in FIG. 2. This polymer is unable to bear the same applied loads typically accessible for p(DCPD) prepared by most catalysts; indeed, the Ru-9 derived polymer behaves much like an elastomeric material, as indicated by the large fracture strain value (1.43 mm/mm). These results demonstrate that it is possible to prepare a frontally polymerized polymer from a resin formulation including DCPD and/or ENB along with a ruthenium catalyst that has an elastic modulus below 0.1 GPa, an ultimate tensile strength of less than 5 MPa, and/or a fracture strain of at least about 1 mm/mm—room temperature properties that are consistent with a ductile or elastomeric polymer.

TABLE 2

Mechanical Properties of Polymers Frontally Polymerized Using Different Catalysts

| Catalytic Formulation | E (GPa) | Ultimate Tensile Strength (MPa) | Fracture Strain (mm/mm) |
| --- | --- | --- | --- |
| Ru-1 | 1.58 ± 0.06 | 47 ± 2 | 0.05 ± 0.01 |
| Ru-2 | 1.45 ± 0.06 | 32 ± 2 | 0.029 ± 0.003 |
| Ru-3 | 1.44 ± 0.04 | 44 ± 2 | 0.058 ± 0.004 |
| Ru-4 | 1.52 ± 0.06 | 48 ± 2 | 0.052 ± 0.007 |
| Ru-5 | 1.50 ± 0.09 | 33 ± 1 | 0.025 ± 0.002 |
| Ru-6 | 1.60 ± 0.05 | 40 ± 1 | 0.035 ± 0.008 |
| Ru-7 | 1.48 ± 0.04 | 36 ± 2 | 0.031 ± 0.005 |
| Ru-8 | 1.30 ± 0.15 | 28 ± 2 | 0.029 ± 0.001 |
| Ru-9 | 0.02 ± 0.01 | 1.06 ± 0.14/0.62 ± 0.08[a] | 1.43 ± 0.04 |

[a] Polymers derived from Ru-9 exhibit a yield point distinct from the ultimate tensile strength. The second, lower value corresponds to the yield point.

The glass transition temperature ($T_g$) of the frontally polymerized polymer may be unusually low and/or lie below room temperature. Typical $T_g$ values for p(DCPD) derived from Ru-1 exist in the range of 120 to 160° C., and these values may be highly dependent on the specific resin formulation, such as solvent choice or monomer composition. In this work, a $T_g$ of 126° C. is obtained for a 60:40 mixture of DCPD:ENB with Ru-1, which is in good agreement with prior reports. Copolymers produced by FROMP with complexes Ru-3, -4, -6, and -7 exhibit similar $T_g$ values (about 100 to 130° C.). It is likely that these values are on the low end of the reported temperature range as the addition of ENB to the resin reduces the potential for crosslinking, thereby lowering the observed $T_g$.

TABLE 3

Glass Transition Temperatures for Polymers Frontally Polymerized Using Different Catalysts and Different DCPD:ENB Ratios

| Catalytic Formulation | $T_g$ (° C.) 80:20 | $T_g$ (° C.) 60:40 |
| --- | --- | --- |
| Ru-1 | 147 ± 1 | 126 ± 1 |
| Ru-2[a] | 72 ± 3 | 50 ± 5/119 ± 3 |
| Ru-3 | 126 ± 1 | 105 ± 8 |
| Ru-4 | 149 ± 1 | 130 ± 1 |
| Ru-5[a] | 133 ± 4 | 59 ± 2/105 ± 6 |
| Ru-6 | 142 ± 3 | 126 ± 2 |
| Ru-7 | 144 ± 3 | 114 ± 2 |
| Ru-8 | 48 ± 3 | 47 ± 5 |
| Ru-9[a] | −28 ± 4 | 1 ± 1/70 ± 1 |

[a] Some samples display two distinct Tg values as indicated by the existence of two peaks in the DMA experiment.

On the other hand, several formulations provide polymers with unusual temperature dependent transition properties. Polymers produced by the bis(phosphine) complex Ru-8 at a 60:40 DCPD:ENB volume ratio, for example, display markedly lower $T_g$ values (47° C.) than the analogous N-heterocyclic carbene containing counterpart, Ru-6 (126° C.). The catalyst structure appears to play an important role in dictating the transition behavior, although the specific mechanism for the observed difference in $T_g$ is still under investigation. Frontal polymerization with Ru-2, Ru-5, and Ru-9 provide copolymers with two characteristic $T_g$ values at DCPD:ENB volume ratios of 60:40; with Ru-2 and Ru-5, the second, higher temperature transition ($T_{g,2}$) occurs in a similar range to those observed with copolymers with a single $T_g$. The lower temperature transition ($T_{g,1}$) exists at about 50 to 60° C.

Most notably, the observed transitions for Ru-9 occur at significantly lower temperatures (−28° C. for 80:20 ratio; 1° C. and 70° C. for 60:40 ratio) despite being fully cured, as determined by the lack of an exothermic event in a post-cure DSC analysis. This suggests that the temperature dependent mechanical properties of Ru-9 derived copolymers do not result from incomplete monomer consumption, and instead are an intrinsic property related to the polymers derived from this catalytic system. These results demonstrate that it is possible to prepare a frontally polymerized polymer from a resin formulation including DCPD and/or ENB along with a ruthenium catalyst that has an uncharacteristically low glass transition temperature, such as a $T_g$ of about 70° C. or less. In some cases, the frontally polymerized polymer may exhibit a $T_g$ below room temperature (where room temperature may be defined as 20-25° C.). Also or alternatively, the polymer may exhibit two characteristic $T_g$ values, where both values are below about 70° C.

The swelling behavior of the polymers can provide an initial surrogate approximation for the associated mechanical properties. In particular, the swellability is related in part to the degree of crosslinking; highly crosslinked materials exhibit minimal void space, thereby precluding solvent intercalation into the extended polymer network. To assess differences in the swelling properties imparted by each of the catalytic formulations, small cylindrical cross-sections of the FROMP polymers were submerged in either tetrahydrofuran (THF) or dichloromethane ($CH_2Cl_2$). In general, the swelling ratio (SR %) of the final polymer is found to be influenced by the monomer composition for all of the catalytic systems, as illustrated by the data of FIGS. 4A-12B. Polymers comprised of primarily ENB exhibit larger SR % than those derived from DCPD; this trend is somewhat expected as ENB contains only one ROMP reactive olefin, and therefore may not provide chemical crosslinking. In contrast, DCPD can undergo ring-opening events at both reactive olefin sites in the presence of Ru-based catalysts; crosslinking occurs at the less strained, 5-membered ring.

Figure 3A:
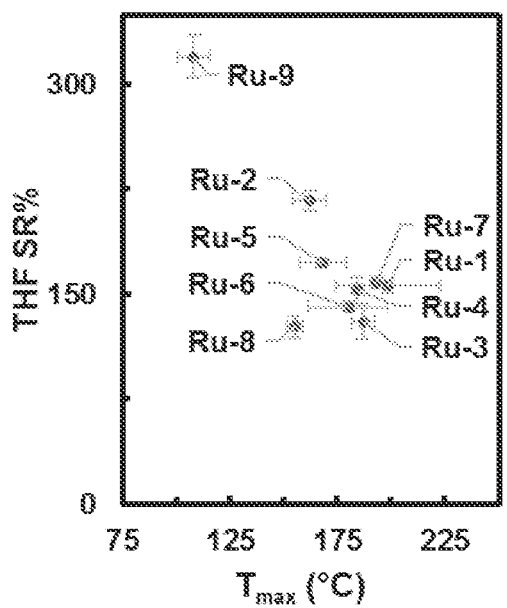
FIGS. 3A and 3B show swelling ratios (SR %) as a function of the corresponding $T_{max}$ for polymers derived from each catalyst solution at a DCPD:ENB volume ratio of 60:40.
Figure 3B:
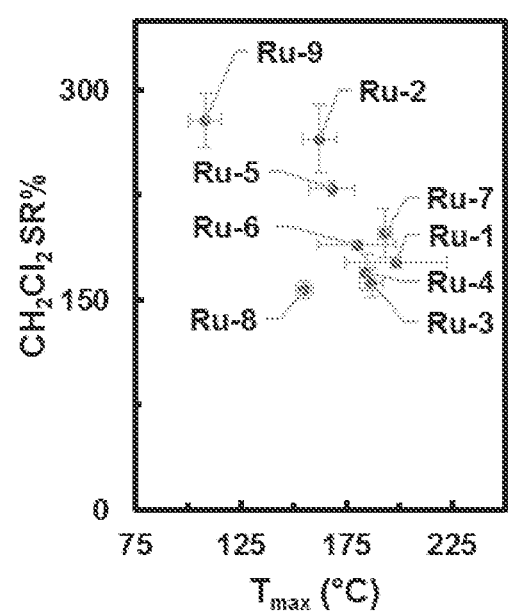
Figure 4A:
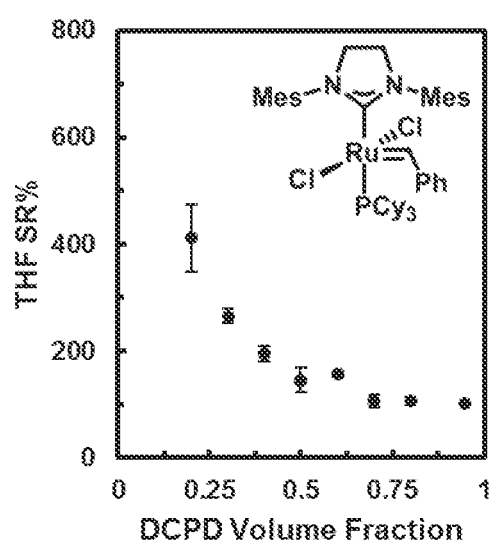
FIGS. 4A and 4B show SR % for polymers derived from catalyst solution Ru-1 at various DCPD:ENB volume ratios.
Figure 4B:
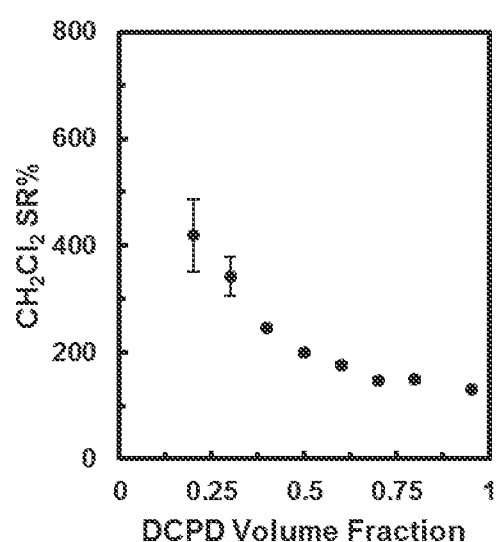
Figures 13A, 13B, 13C:
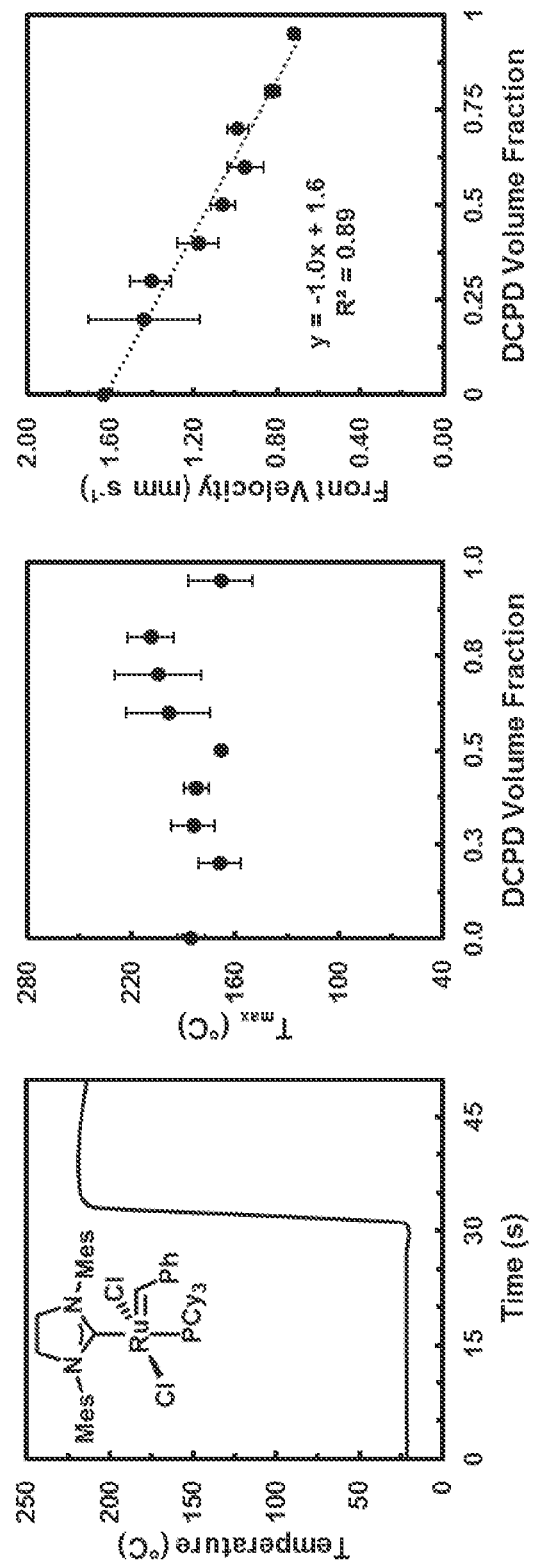
FIGS. 13A-13C show thermal and velocity plots for FROMP with catalyst solution Ru-1.
Figures 14A, 14B, 14C:
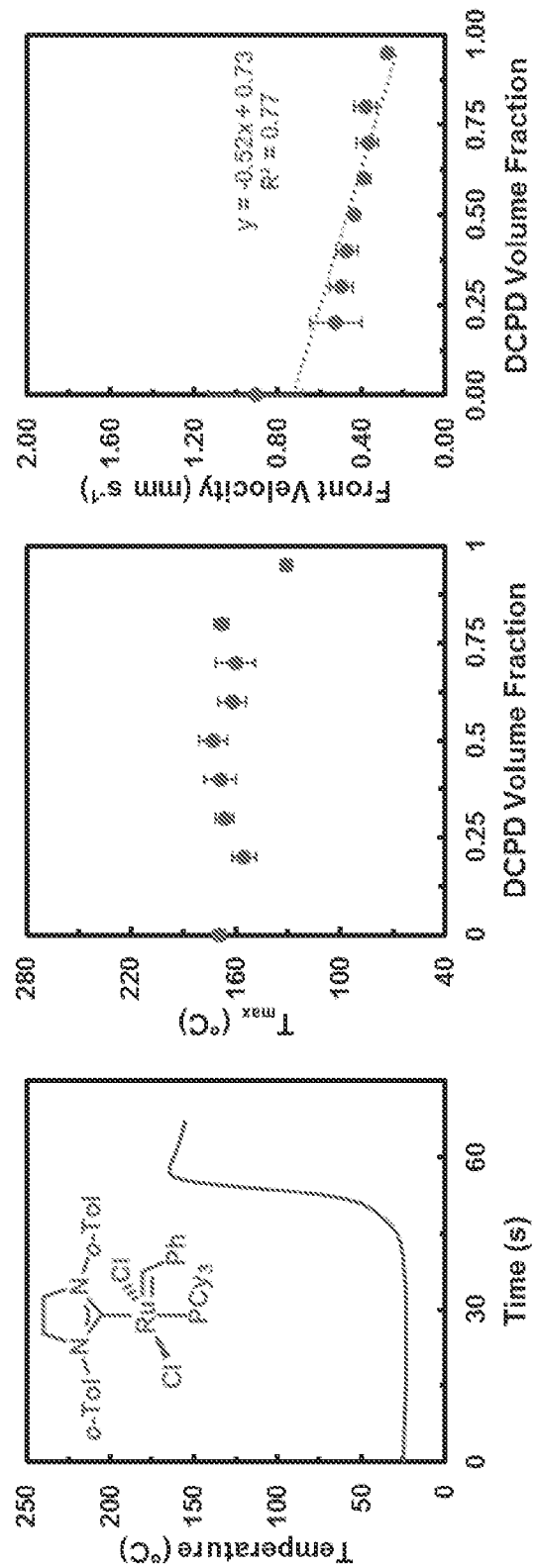
FIGS. 14A-14C show thermal and velocity plots for FROMP with catalyst solution Ru-2.
Figures 15A, 15B, 15C:
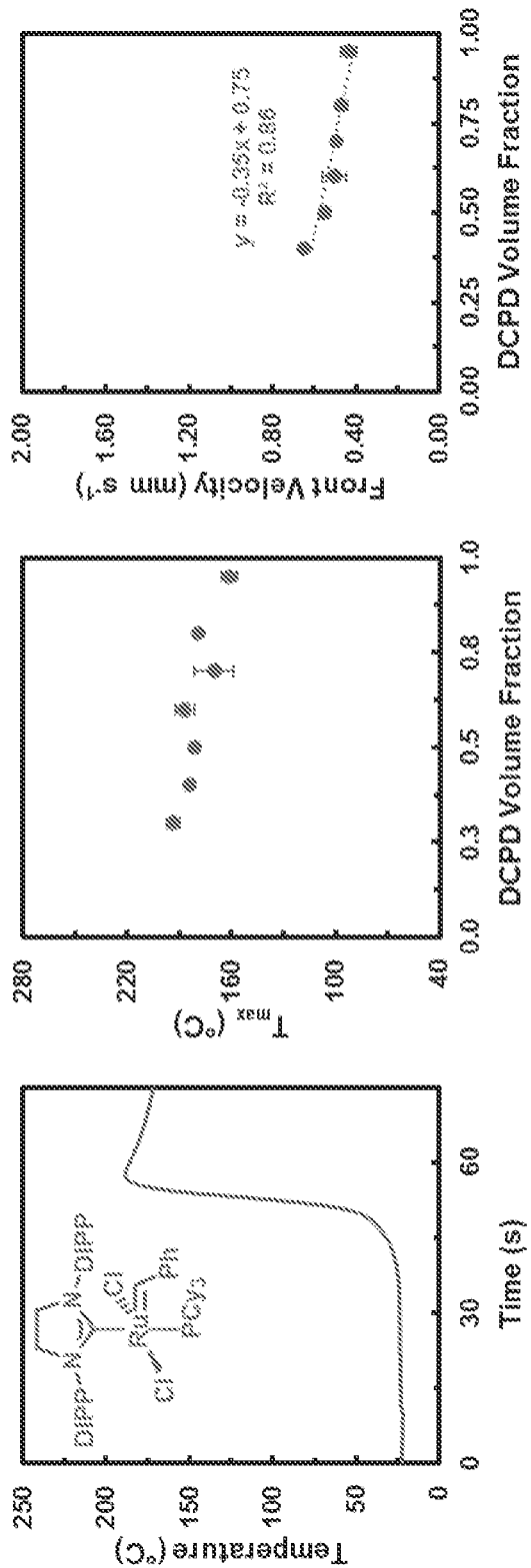
FIGS. 15A-15C show thermal and velocity plots for FROMP with catalyst solution Ru-3.
Figures 16A, 16B, 16C:
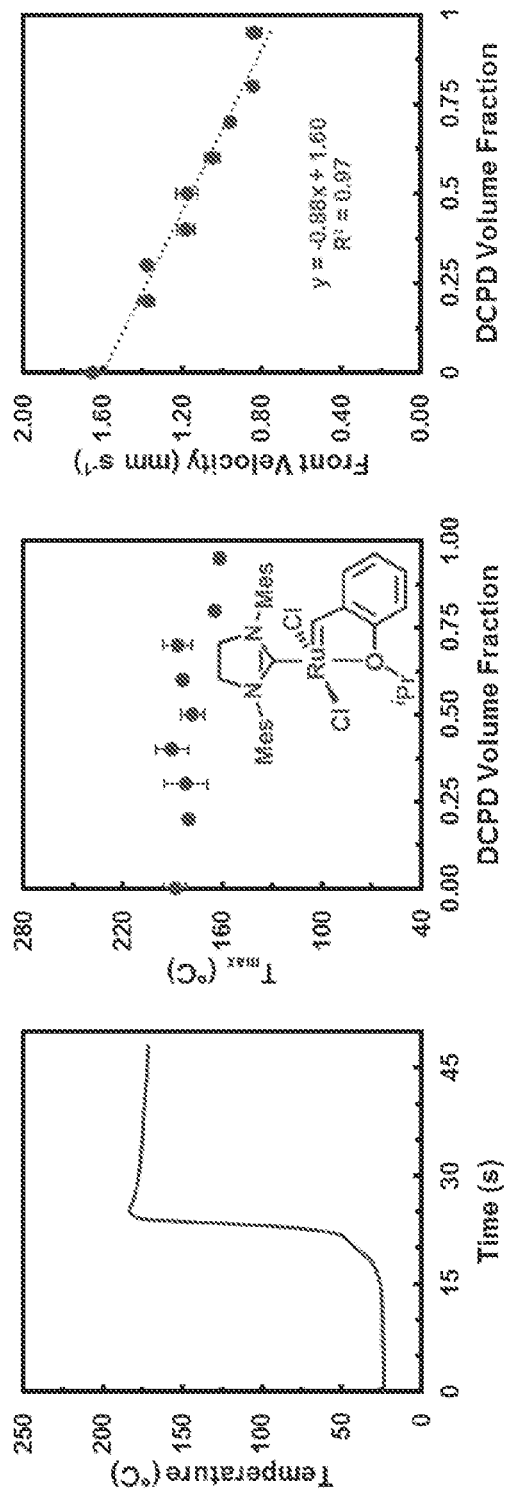
FIGS. 16A-16C show thermal and velocity plots for FROMP with catalyst solution Ru-4.
Figures 17A, 17B, 17C:
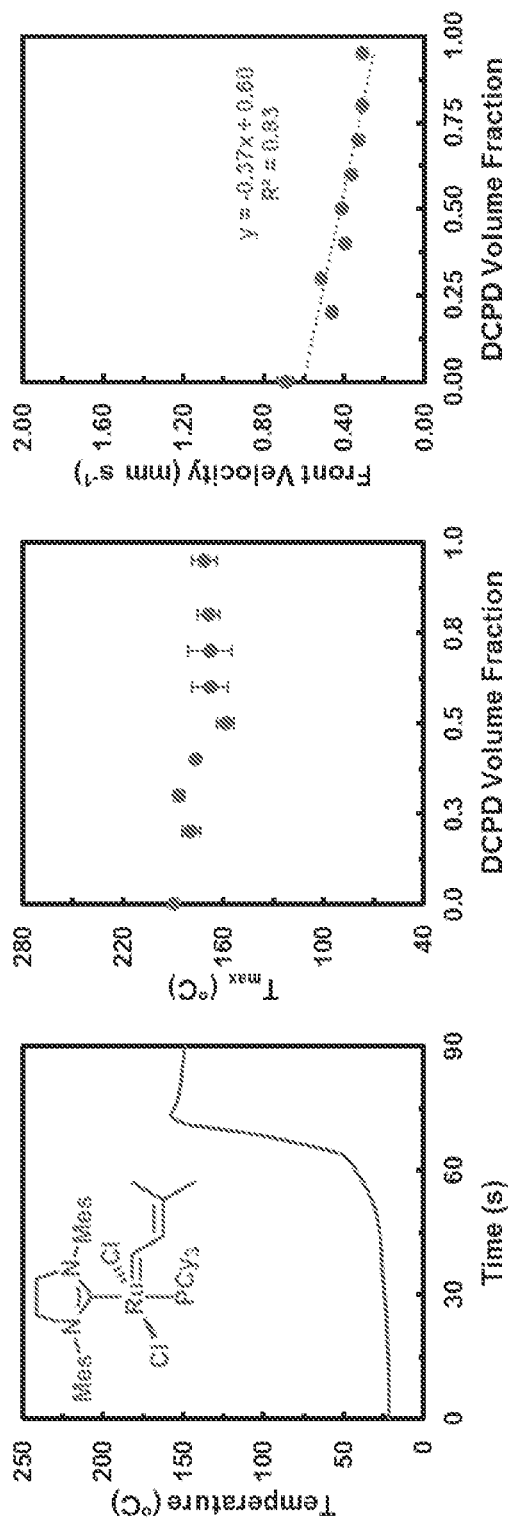
FIGS. 17A-17C show thermal and velocity plots for FROMP with catalyst solution Ru-5.
Figures 18A, 18B, 18C:
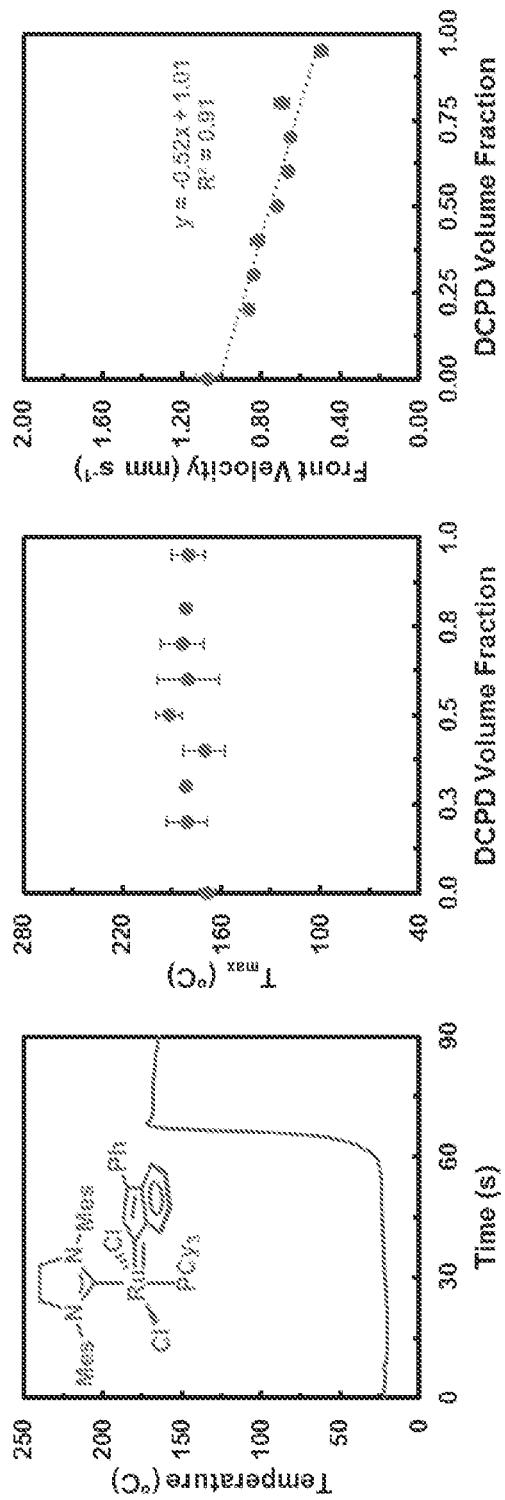
FIGS. 18A-18C show thermal and velocity plots for FROMP with catalyst solution Ru-6.
Figures 19A, 19B, 19C:
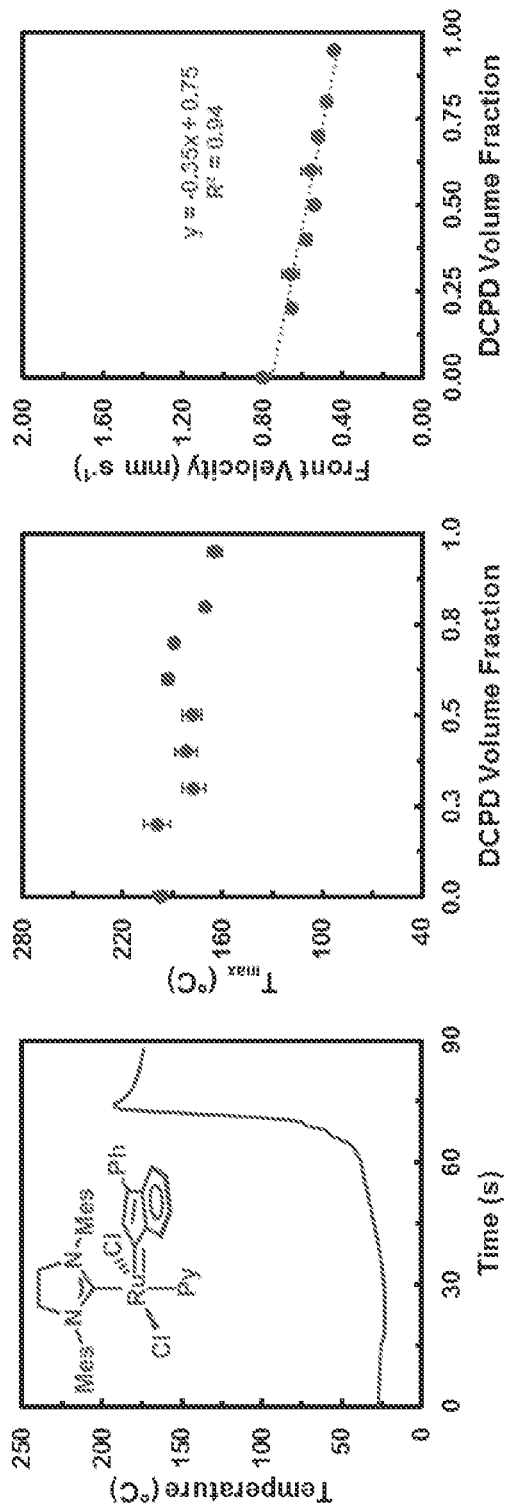
FIGS. 19A-19C show thermal and velocity plots for FROMP with catalyst solution Ru-7.
Figures 20A, 20B, 20C:
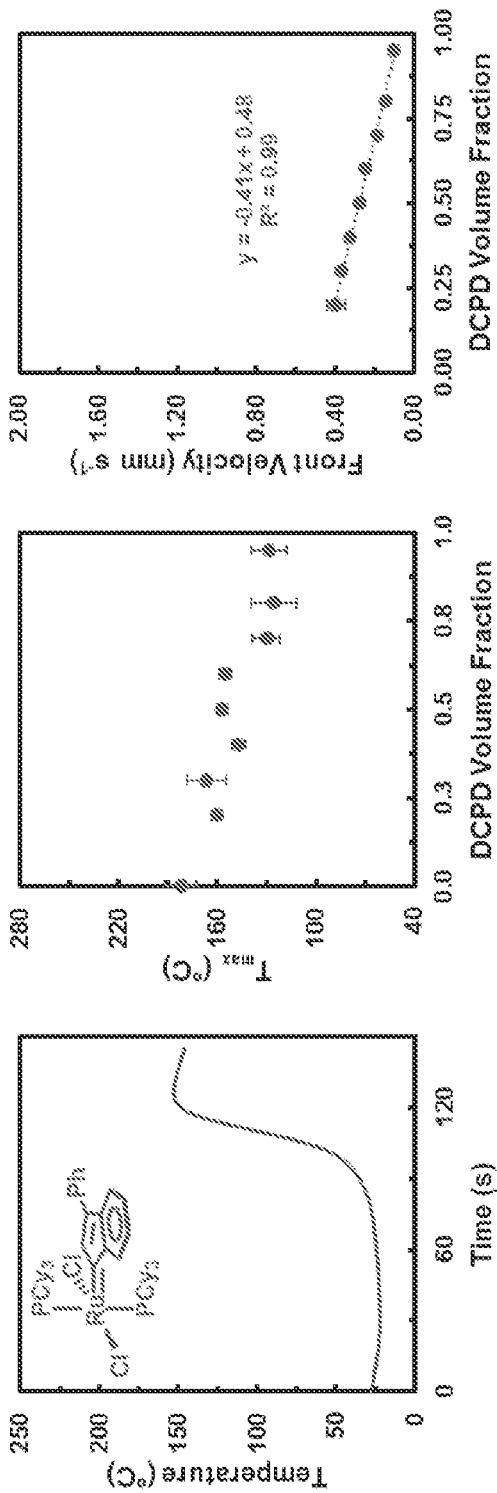
FIGS. 20A-20C show thermal and velocity plots for FROMP with catalyst solution Ru-8.
Figures 21A, 21B, 21C:
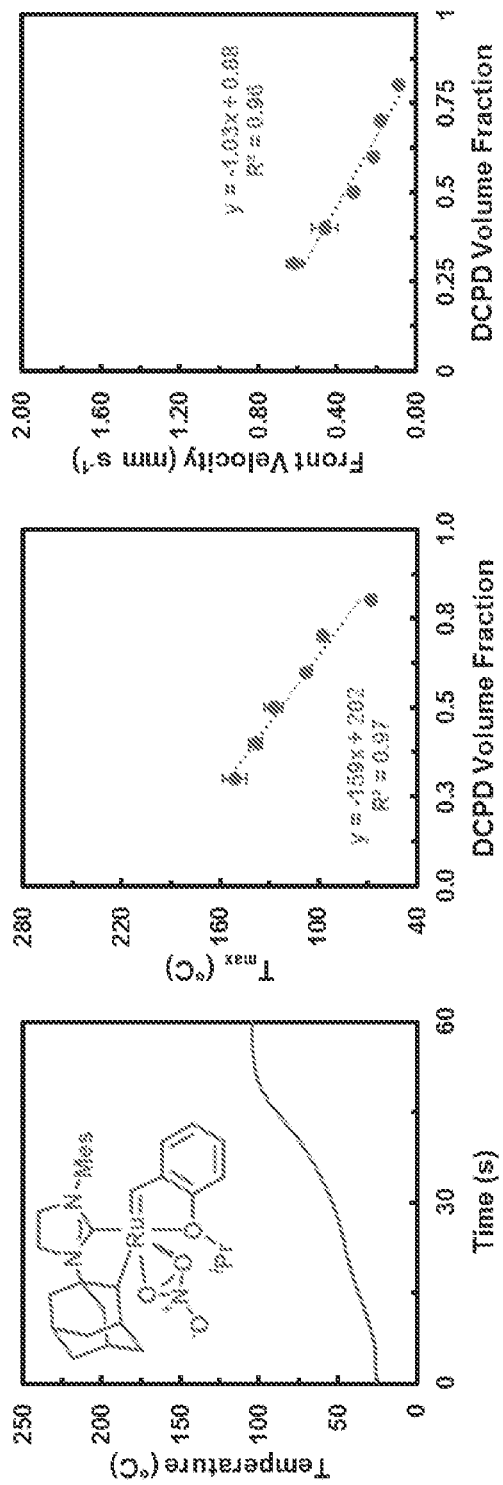
FIGS. 21A-21C show thermal and velocity plots for FROMP with catalyst solution Ru-9.

The swelling of each of the polymers is influenced to some degree by the choice of catalytic system employed, as illustrated. The maximum temperatures exhibited during frontal polymerization for each of the catalytic systems appears to influence the swellability, as shown in FIGS. 3A and 3B. Polymers that form from colder fronts (i.e., smaller $T_{max}$) tend to provide highly swellable copolymers, as observed with catalytic formulation Ru-9 as an example. At a DCPD:ENB ratio of 60:40, Ru-9 derived polymers exhibit SR % of 320±14 and 280±20 after submersion for 24 h in THF and $CH_2Cl_2$, respectively. In contrast, polymers generated by hotter fronts, such as those obtained by the Ru-1 formulation, swelled nearly half as much (155±4 and 175±4 in THF and $CH_2Cl_2$, respectively). These results suggest that the degree of crosslinking may correlate to reaction temperature. The results also demonstrate that it is possible to prepare a frontally polymerized polymer from a resin formulation including DCPD and/or ENB along with a ruthenium catalyst that has a high swelling ratio, e.g., at least about 270% in tetrahydrofuran, and in some cases the swelling ratio may be 270-450%.

As indicated above, the deformable polymer may form part or all of the polymeric body. In other words, an entirety of the polymeric body or only a portion (e.g., one or more layers) of the polymeric body may comprise the deformable polymer. In the latter case, where only a portion of the polymeric body comprises the deformable polymer, another portion of the polymeric body may comprise an additional polymer that is less deformable (e.g., exhibits a lower fracture strain, a higher elastic modulus, or a higher ultimate tensile strength) than the deformable polymer. For example, see the description above of a polymeric body including first and second polymers. Thus, the polymeric body may exhibit spatially varying mechanical and/or other properties. In one example, the additional polymer may comprise frontally polymerized pDCPD and/or pENB prepared from a resin formulation similar to that described above, but which includes a different ruthenium catalyst and/or a different combination of ruthenium catalysts and/or a different volume ratio of DCPD to ENB. Also, as described above, the polymeric body may include one or more of the additional polymers.

Accordingly, polymeric bodies exhibiting spatial variations or a gradient in mechanical or other properties (e.g., elastic modulus, swelling ratio, glass transition temperature, etc.) may be prepared by frontally polymerizing two or more resin formulations including different ruthenium catalysts, different combinations of ruthenium catalysts, and/or different volume ratios of DCPD to ENB. The resulting spatial variations in properties may take the form of a smooth or stepped change, such as a monotonic increase or decrease or a step-function change in properties.

For example, referring now to FIG. 1D, a first resin formulation 102a including DCPD and/or ENB along with a ruthenium catalyst as described above may be disposed in a mold or other container 110, and frontal polymerization may be initiated by applying heat and/or light to a region 104 (e.g., the bottom) of the container 110. As the polymerization front 106 moves through the first resin formulation 102a (e.g., in an upward direction), forming a first polymer 108a comprising pDCPD and/or pENB, a second resin formulation 102b may be deposited or injected on the first resin formulation 102a downstream of the front 106. The second resin formulation 102b may also contain DCPD and/or ENB as described above, but may include a different ruthenium catalyst and/or a different combination of ruthenium catalysts and/or a different volume ratio of DCPD to ENB than the first resin formulation 102a. The second resin formulation 102b may be deposited by a controlled flow rate process using, for example, a syringe pump or 3D printing nozzle. Diffusion-induced mixing of the first and second resin formulations 102a,102b may be limited or prevented by the rapid propagation of the reaction front 106 once frontal polymerization is initiated. In addition, the flow rate of the second resin formulation 102b may be controlled to at least roughly match the velocity of the polymerization front 106. As the front 106 propagates through the second resin formulation 102b, forming a second polymer 108b comprising pDCPD and/or pENB adjacent to the first polymer 108a, one or more additional resin formulations 102c may be deposited on the second resin formulation 102b downstream of the front 106, if desired, as described above for the second resin formulation 102b. The additional resin formulation(s) 102c may contain DCPD and/or ENB but may include a different ruthenium catalyst and/or a different combination of ruthenium catalysts and/or a different volume ratio of DCPD to ENB than the first and/or second resin formulations. Ultimately, the polymerization front 106 propagates through the additional resin formulation(s) 102c, forming a third polymer 108c comprising pDCPD and/or pENB adjacent to the second polymer 108b. Using this approach, a polymeric body 112 that exhibits spatially varying mechanical and/or other properties (e.g., elastic modulus, $T_g$, tensile strength, fracture strain, etc.) may be produced.

Generally speaking, the exothermic polymerization reaction may be activated by exposing a local or global region (referred to as "the region") of the resin formulation to heat, light, electric current or another activator. Activation (e.g., heating) of the exothermic polymerization reaction may be transient, lasting for less than one minute or even less than one second. In other words, after initiation of the exothermic polymerization reaction, no external activation is required. Heat may be applied by conduction, convection, or radiation. For example, heat may be applied conductively by physically contacting a heated element (such as a soldering iron, electrical resistive heater, resistive wire, hot plate, etc.) to the resin formulation or to a surface of a container in which the resin formulation is contained. Preferably, the activation takes place shortly after preparation of the resin formulation to prevent premature curing or gelation.

Advantageously, frontal polymerization may occur rapidly. For example, the polymerization front may move through the resin formulation at a rate of at least about 2 cm/min (0.3 mm/s), at least about 7 cm/min (1.2 mm/s), and in some cases as high as, or even higher than, about 10 cm/min (1.6 mm/s). Depending on the catalyst species, monomer(s) present and possibly other factors, such as boundary/initial conditions (e.g., thermal diffusivity of mold/container, ambient temperature, monomer solution temperature) and/or catalyst concentration, the rate of propagation of the polymerization front may range from about 0.3 mm/s to about 1.6 mm/s or higher. FIGS. 13A-21C show thermal and velocity plots for FROMP using the different catalyst formulations shown in FIG. 1B with a monomer solution including a 60:40 DCPD:ENB volume ratio.

The polymerization front may have a linear shape, a curved shape or another shape, which may be influenced by the geometry of the region where polymerization is initiated, the type of monomer solution, and/or other factors. Typically the polymerization front is smooth and stable, but in some cases the polymerization front may exhibit irregularities or instabilities as it propagates through the monomer solution. The direction of propagation of the front may be referred to as a downstream direction.

The polymeric body may take the shape of the mold or other container in which frontal polymerization is carried out. Cylindrical molds, rectangular channel molds, U-shaped molds, or molds/containers of other shapes may be employed. In some examples, after polymerization, a polymeric body having the shape of the mold in which it was fabricated may undergo machining, laser cutting or another material removal process to arrive at a modified (e.g., more complex) shape. Accordingly, polymeric bodies of any desired size and shape may be fabricated by frontal polymerization.

To control frontal polymerization, each of the ruthenium catalyst and organophosphite inhibitor may be provided at a suitable concentration to influence the polymerization rate and the peak temperature of the monomer solution. For example, more catalyst can be added or the inhibitor concentration can be reduced to increase the peak temperature and/or the velocity of the polymerization front.

Experimental Methods

Initial optimization for each ruthenium catalyst is performed with a resin formulation comprising a 95:5 volume ratio of DCPD to ENB. Preferred catalyst and P(O"Bu)$_3$ loadings are determined based on minimum quantities required to support a stable front after thermal ignition with a soldering iron. In some cases, such as with Ru-8, inhibitor was not required to form a stable polymer front. Surprisingly, the Ru-9 complex is found to decompose in the presence of added phosphite ligand, and thus the catalyst solution including Ru-9 does not employ an inhibitor in the examples here.

The catalyst solutions may include 35-90 mg of the ruthenium catalyst, 0-130 μL of P(O"Bu)$_3$, and 2.0-2.5 mL of PhCy. Separately, monomer solutions are prepared at the desired DCPD:ENB volume ratios (from 0:100 to 95:5 in these examples), and added to the catalyst solution and mixed. Mixing may occur with the aid of a sonication bath. The resin formulations are preferably used immediately after mixing. Frontal parameters are determined for each catalyst solution across a range of resin formulations, which span DCPD:ENB volume ratios of 95:5 to 0:100. Not all formulations, however, support stable polymer fronts across this range of monomer ratios.

Frontal Polymerization and Characterization

The resins described above are transferred to 13×100 mm glass test tubes (total resin volume ca. 3 mL). A K-type thermocouple (TMQSS, Omega) is inserted into the center of the test tube such that the tip is about 1 cm below the surface of the resin. Frontal polymerization is initiated by direct contact of a hot 40 W soldering iron (Weller, WLC100) to the side of the glass test tube at a height corresponding to the surface of the resin solution. Front propagation is captured on a Samsung SM-G930V cellular phone equipped with a Dual Pixel 12.0 MP camera, which provides UHD 4K video footage (3840×2160 @30 fps). The front velocities ($v_f$) are determined for each catalytic system from this recorded footage using the open source physics (OSP) software package Tracker®. Temperature profiles (and maximum front temperature, $T_{max}$) are recorded by the inserted thermocouple and monitored by a custom Labview program. Front velocities for resins derived from Ru-3 are recorded using real-time IR thermographic video recording from a FLIR T1020, as the fronts are difficult to observe by eye.

Swell Tests

Polymer samples for swelling are prepared from the above-described test tube samples; uniform flat discs (13 mm diameter, about 5 mm height, about 0.5 g) are cut by a metal saw blade from longer polymer rod samples. The initial mass of each sample is calculated prior to submersion in 10 mL of either dichloromethane ($CH_2Cl_2$) or tetrahydrofuran (THF) solvents. After 24 h, the samples are removed from the solvent and dried prior to determining the swollen mass ($M_s$). The solvent swollen samples are stored in a 60° C. vacuum for 2 h to remove volatile components, and then the dry masses ($M_d$) are determined. The swelling ratios (% SR) are determined by equation 1:

$$SR\ \% = \frac{M_s - M_d}{M_d} * 100 \qquad (1)$$

Preparation of Thermomechanical and Tensile Test Samples

Molds having a dogbone shape with gauge dimensions of 25.4×3.75×4.00 mm are fabricated with RTV-630 silicone molding compound; a glass slide (75.0×25.0×1.00 mm) is clamped atop the open face of the mold, and resin is injected from the top of the mold using a syringe. Prior to injection, resins are allowed to sit at ambient temperatures until they achieve a thin, gel-like consistency to avoid boiling within the mold during frontal polymerization. Frontal polymerization is triggered by applying the tip of a 40 W soldering iron (Weller, WLC100) to the surface of the glass slide until front propagation occurs (about 1-10 s). Samples are cooled to ambient temperatures before removal from the mold. Dogbone samples are polished to about 0.5-1.0 mm thickness in order to characterize the thermomechanical behavior of the samples via dynamic mechanical analysis (DMA). The following modifications to the mold design are used when preparing Ru-9 DMA samples. A thin rubber mold in a U-shape (OD: 75.0×25.0 mm; ID: 65.0 mm×15.0 mm; 0.5 mm thickness) is clamped between two glass slides, and monomer resin is injected into to fill the void space inside the U-shaped mold. After frontal polymerization, the thin film samples (about 0.5-1.0 mm thick) are cooled to ambient temperatures and carefully removed from the glass slide.

Dynamic Mechanical Analysis (DMA)

DMA is employed to evaluate the thermomechanical properties of the frontally polymerized polymers, including p(DCPD-co-ENB) thin film samples of about 0.5-1.0 mm in thickness. DMA tests are performed on a TA Instruments RSA G2 with supplied tensile grips under an inert atmosphere. The gauge length is maintained at 10.0 mm, and dynamic loading is applied at 1 Hz and 0.3% strain amplitude. The temperature of the sample is increased linearly at 5° C. min$^{-1}$ from −20 to 250° C. for all catalyst systems except Ru-9. For Ru-9, a temperature ramp of 5° C. min$^{-1}$ is performed from −50 to 250° C.

Quasi-Static Tensile Testing

Tensile measurements of p(DCPD-co-ENB) dogbone samples are performed at ambient temperatures using an Instron 5984 universal testing system equipped with a laser extensometer and a 5 kN load cell. An extension rate of 5.00 mm min$^{-1}$ is applied until sample failure. Young's elastic modulus (E) is calculated by the slope of a best-fit line over the 0.1-0.4% strain region of the stress-strain curve. Polymers derived from Ru-9 display a yield point, which is calculated at the point where the slope of the stress-strain curve equals 0. The ultimate tensile strength is calculated as the maximum stress value achieved during the test. The strain at failure is calculated at the point of sample fracture.

The subject matter of the disclosure may also relate to the following aspects:

A first aspect relates to a frontally polymerized polymeric body comprising: a deformable polymer comprising polydicyclopentadiene (pDCPD) and/or poly(5-ethylidene-2-norbornene) (pENB), the deformable polymer having a fracture strain of at least about 0.5 mm mm−1.

A second aspect relates to the frontally polymerized polymeric body of the first aspect, wherein the deformable polymer is a copolymer comprising the pDCPD and the pENB.

A third aspect relates to the frontally polymerized polymeric body of any preceding aspect, wherein the deformable polymer is a homopolymer comprising the pENB or the pDCPD.

A fourth aspect relates to the frontally polymerized polymeric body of any preceding aspect, wherein the deformable polymer exhibits elastomeric behavior at room temperature.

A fifth aspect relates to the frontally polymerized polymeric body of any preceding aspect, wherein the deformable polymer is plastically deformable at room temperature.

A sixth aspect relates to the frontally polymerized polymeric body of any preceding aspect, wherein the deformable polymer exhibits a swelling ratio in tetrahydrofuran of at least about 270%.

A seventh aspect relates to the frontally polymerized polymeric body of any preceding aspect, wherein the deformable polymer comprises a glass transition temperature below room temperature.

An eighth aspect relates to the frontally polymerized polymeric body of any preceding aspect, wherein the deformable polymer comprises an elastic modulus (E) of less than 100 MPa.

A ninth aspect relates to the frontally polymerized polymeric body of any preceding aspect, wherein the deformable polymer comprises an ultimate tensile strength of less than 5 MPa.

A tenth aspect relates to the frontally polymerized polymeric body of any preceding aspect, wherein the fracture strain is at least about 1 mm mm−1.

An eleventh aspect relates to the frontally polymerized polymeric body of any preceding aspect, wherein an entirety of the polymeric body comprises the deformable polymer.

A twelfth aspect relates to the frontally polymerized polymeric body of any preceding aspect, wherein only a portion of the polymeric body comprises the deformable polymer.

A thirteenth aspect relates to the frontally polymerized polymeric body of the twelfth aspect, wherein the portion includes one or more layers of the polymeric body.

A fourteenth aspect relates to the frontally polymerized polymeric body of any preceding claim, wherein the deformable polymer is prepared by frontal polymerization from a first resin formulation comprising: dicyclopentadiene (DCPD) and/or 5-ethylidene-2-norbornene (ENB) at a DCPD:ENB volume ratio in a range from 0:100 to 100:0; and a ruthenium catalyst.

A fifteenth aspect relates to the frontally polymerized polymeric body of the fourteenth aspect, wherein the first resin formulation includes more than one ruthenium catalyst.

A sixteenth aspect relates to the frontally polymerized polymeric body of the fourteenth or fifteenth aspect, wherein the ruthenium catalyst comprises Ru-9.

A seventeenth aspect relates to the frontally polymerized polymeric body of any of the fourteenth through the sixteenth aspects, wherein the DCPD:ENB volume ratio of the first resin formulation is in a range from 60:40 to 95:5.

An eighteenth aspect relates to the frontally polymerized polymeric body of any of the fourteenth through the seventeenth aspects, wherein the first resin formulation further comprises P(O″Bu)3 and/or phenylcyclohexane (PhCy).

A nineteenth aspect relates to the frontally polymerized polymeric body of any preceding claim, further comprising a second polymer adjacent to the deformable polymer, the second polymer having a lower fracture strain than the deformable polymer.

A twentieth aspect relates to the frontally polymerized polymeric body of the nineteenth aspect, wherein the second polymer is prepared by frontal polymerization from a second resin formulation including the DCPD and/or the ENB, and comprising: a different ruthenium catalyst and/or a different combination of ruthenium catalysts and/or a different volume ratio of DCPD to ENB than the first resin formulation.

A twenty-first aspect relates to a frontally polymerized polymeric body comprising: a first polymer comprising polydicyclopentadiene (pDCPD) and/or poly(5-ethylidene-2-norbornene) (pENB); and a second polymer adjacent to the first polymer, the second polymer comprising the pDCPD and/or the pENB and being more or less deformable than the first polymer.

A twenty-second aspect relates to the frontally polymerized polymeric body the twenty-first aspect, wherein the first polymer has a fracture strain of at least about 0.5 mm mm$^{-1}$, or at least about 1 mm mm$^{-1}$, and wherein the second polymer has a lower fracture strain than the first polymer.

A twenty-third aspect relates to the frontally polymerized polymeric body of the twenty-first aspect or the twenty-second aspect, wherein the second polymer comprises a higher degree of crosslinking than the first polymer.

A twenty-fourth aspect relates to the frontally polymerized polymeric body of any of the twenty-first through the twenty-third aspects, wherein the first polymer and/or the second polymer is a copolymer comprising the pDCPD and the pENB.

A twenty-fifth aspect relates to the frontally polymerized polymeric body of any one of the twenty-first through the twenty-fourth aspects, wherein the first polymer and/or the second polymer is a homopolymer comprising the pENB.

A twenty-sixth aspect relates to the frontally polymerized polymeric body of any of the twenty-first through the twenty-fifth aspects, wherein the first polymer: exhibits elastomeric behavior at room temperature; and/or is plastically deformable at room temperature; and/or exhibits a swelling ratio in tetrahydrofuran of at least about 270%; and/or comprises a glass transition temperature below room temperature; and/or comprises an elastic modulus (E) of less than 100 MPa; and/or comprises an ultimate tensile strength of less than 5 MPa.

A twenty-seventy aspect relates to the frontally polymerized polymeric body of any one of the twenty-first through the twenty-sixth aspects, wherein an entirety of the polymeric body comprises the first and second polymers.

A twenty-eighth aspect relates to the frontally polymerized polymeric body of any one of the twenty-first through the twenty-sixth aspects, wherein only a portion of the polymeric body comprises the first and second polymers, the polymeric body further comprising one or more additional polymers.

A twenty-ninth aspect relates to a method of producing a polymeric body including spatially varying mechanical properties, the method comprising: activating a region of a first resin formulation to initiate an exothermic polymerization reaction and generate a self-propagating polymerization front, the first resin formulation comprising: dicyclopentadiene (DCPD) and/or 5-ethylidene-2-norbornene (ENB) at a DCPD:ENB volume ratio in a range from 0:100 to 100:0; and a ruthenium catalyst; forming, as the self-propagating polymerization front moves through the first resin formulation and polymerizes the DCPD and/or the ENB, a first polymer comprising polydicyclopentadiene (pDCPD) and/or poly(5-ethylidene-2-norbornene) (pENB); depositing, while the self-propagating polymerization front moves through the first resin formulation, a second resin formulation on the first resin formulation downstream of the polymerization front, the second resin formulation including the DCPD and/or the ENB and comprising a different ruthenium catalyst and/or a different combination of ruthenium catalysts and/or a different volume ratio of DCPD to ENB than the first resin formulation; and forming, as the self-propagating polymerization front moves through the second resin formulation and polymerizes the DCPD and/or the ENB, a second polymer comprising the pDCPD and/or the pENB adjacent to the first polymer, wherein the second polymer is more or less deformable than the first polymer, the polymeric body thereby exhibiting spatially varying mechanical and/or other properties.

A thirtieth aspect relates to the method of the twenty-ninth aspect, wherein the mechanical or other properties include one or more of: swelling ratio, glass transition temperature, fracture strain, elastic modulus, and ultimate tensile strength.

A thirty-first aspect relates to the method of the twenty-ninth or thirtieth aspects, wherein the first polymer and/or the second polymer has a fracture strain of at least about 0.5 mm mm$^{-1}$.

A thirty-second aspect relates to the method of any of the twenty-ninth through the thirty-first aspects, wherein the first and/or second resin formulation comprises a Ru-9 catalyst.

A thirty-third aspect relates to the method of any of the twenty-ninth through the thirty-second aspects, further comprising depositing one or more additional resin formulations on the second resin formulation downstream of the polymerization front, each of the additional resin formulations including the DCPD and/or the ENB and comprising a different ruthenium catalyst and/or a different combination of ruthenium catalysts and/or a different volume ratio of DCPD to ENB than the first and/or second resin formulation; and forming, as the self-propagating polymerization front moves through the one or more additional resin formulations, one or more additional polymers comprising the pDCPD and/or the pENB adjacent to the second polymer, wherein the one or more additional polymers are more or less deformable than the first polymer and/or the second polymer Although the present invention has been described in considerable detail with reference to certain embodiments thereof, other embodiments are possible without departing from the present invention. The spirit and scope of the appended claims should not be limited, therefore, to the description of the preferred embodiments contained herein.

All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A frontally polymerized polymeric body comprising:
a deformable polymer comprising polydicyclopentadiene (pDCPD) and/or poly(5-ethylidene-2-norbornene) (pENB), the deformable polymer having a fracture strain of at least 0.5 mm mm$^{-1}$,
wherein the deformable polymer is prepared by frontal polymerization from a first resin formulation comprising: dicyclopentadiene (DCPD) and/or 5-ethylidene-2-norbornene (ENB) at a DCPD:ENB volume ratio in a range from 0:100 to 100:0; and more than one ruthenium catalyst.

2. The frontally polymerized polymeric body of claim 1, wherein the deformable polymer is a copolymer comprising the pDCPD and the pENB.

3. The frontally polymerized polymeric body of claim 1, wherein the deformable polymer is a homopolymer comprising the pENB or the pDCPD.

4. The frontally polymerized polymeric body of claim 1, wherein the deformable polymer exhibits elastomeric behavior at room temperature.

5. The frontally polymerized polymeric body of claim 1, wherein the deformable polymer is plastically deformable at room temperature.

6. The frontally polymerized polymeric body of claim 1, wherein an entirety of the polymeric body comprises the deformable polymer.

7. The frontally polymerized polymeric body of claim 1, wherein only a portion of the polymeric body comprises the deformable polymer.

8. The frontally polymerized polymeric body of claim 1, wherein the DCPD:ENB volume ratio of the first resin formulation is in a range from 60:40 to 95:5.

9. A frontally polymerized polymeric body comprising:
a first polymer comprising polydicyclopentadiene (pDCPD) and/or poly(5-ethylidene-2-norbornene) (pENB); and
a second polymer adjacent to the first polymer, the second polymer comprising the pDCPD and/or the pENB and being more or less deformable than the first polymer.

10. The frontally polymerized polymeric body of claim 9, wherein the first polymer has a fracture strain of at least 0.5 mm mm$^{-1}$, and wherein the second polymer has a lower fracture strain than the first polymer.

11. The frontally polymerized polymeric body of claim 9, wherein the second polymer comprises a higher degree of crosslinking than the first polymer.

12. The frontally polymerized polymeric body of claim 9, wherein the first polymer and/or the second polymer is a copolymer comprising the pDCPD and the pENB.

13. The frontally polymerized polymeric body of claim 9, wherein the first polymer and/or the second polymer is a homopolymer comprising the pENB.

14. The frontally polymerized polymeric body of claim 9, wherein only a portion of the polymeric body comprises the first and second polymers, the polymeric body further comprising one or more additional polymers.

15. A method of producing a polymeric body including spatially varying mechanical and/or other properties, the method comprising:

activating a region of a first resin formulation to initiate an exothermic polymerization reaction and generate a self-propagating polymerization front, the first resin formulation comprising: dicyclopentadiene (DCPD) and/or 5-ethylidene-2-norbornene (ENB) at a DCPD:ENB volume ratio in a range from 0:100 to 100:0; and a ruthenium catalyst;

forming, as the self-propagating polymerization front moves through the first resin formulation and polymerizes the DCPD and/or the ENB, a first polymer comprising polydicyclopentadiene (pDCPD) and/or poly(5-ethylidene-2-norbornene) (pENB);

depositing, while the self-propagating polymerization front moves through the first resin formulation, a second resin formulation on the first resin formulation downstream of the polymerization front, the second resin formulation including the DCPD and/or the ENB and comprising a different ruthenium catalyst and/or a different combination of ruthenium catalysts and/or a different volume ratio of DCPD to ENB than the first resin formulation; and forming, as the self-propagating polymerization front moves through the second resin formulation and polymerizes the DCPD and/or the ENB, a second polymer comprising the pDCPD and/or the pENB adjacent to the first polymer, wherein the second polymer is more or less deformable than the first polymer, the polymeric body thereby exhibiting spatially varying mechanical and/or other properties.

16. The method of claim 15, wherein the mechanical and/or other properties include one or more of: swelling ratio, glass transition temperature, fracture strain, elastic modulus, and ultimate tensile strength.

17. The method of claim 15, wherein the first polymer and/or the second polymer has a fracture strain of at least 0.5 mm mm$^{-1}$.

18. The method of claim 15, further comprising depositing one or more additional resin formulations on the second resin formulation downstream of the polymerization front, each of the additional resin formulations including the DCPD and/or the ENB and comprising a different ruthenium catalyst and/or a different combination of ruthenium catalysts and/or a different volume ratio of DCPD to ENB than the first and/or second resin formulation; and forming, as the self-propagating polymerization front moves through the one or more additional resin formulations, one or more additional polymers comprising the pDCPD and/or the pENB adjacent to the second polymer, wherein the one or more additional polymers are more or less deformable than the first polymer and/or the second polymer.

19. A frontally polymerized polymeric body comprising:
a deformable polymer comprising polydicyclopentadiene (pDCPD) and/or poly(5-ethylidene-2-norbornene) (pENB), the deformable polymer having a fracture strain of at least 0.5 mm mm$^{-1}$, wherein the deformable polymer is prepared by frontal polymerization from a first resin formulation comprising dicyclopentadiene (DCPD) and 5-ethylidene-2-norbornene (ENB) at a DCPD:ENB volume ratio in a range from 60:40 to 80:20.

\* \* \* \* \*